United States Patent
Taylor et al.

(10) Patent No.: US 8,284,993 B2
(45) Date of Patent: Oct. 9, 2012

(54) DECENTRALIZED TRACKING OF PACKAGES ON A CONVEYOR

(75) Inventors: Bryan Dale Taylor, Bono, AR (US); Clifford Allen Mullis, Jonesboro, AR (US); Cole Jeremiah Prince, Jonesboro, AR (US)

(73) Assignee: Hytrol Conveyor Company, Inc., Jonesboro, AK (US)

( * ) Notice: Subject to any disclaimer, the term of this patent is extended or adjusted under 35 U.S.C. 154(b) by 772 days.

(21) Appl. No.: 12/487,439

(22) Filed: Jun. 18, 2009

(65) Prior Publication Data

US 2010/0322473 A1  Dec. 23, 2010

(51) Int. Cl.
*G06K 9/00* (2006.01)
*B65G 41/00* (2006.01)
(52) U.S. Cl. ......... 382/103; 198/300; 198/321; 198/348
(58) Field of Classification Search .................. None
See application file for complete search history.

(56) References Cited

U.S. PATENT DOCUMENTS

| | | | | |
|---|---|---|---|---|
| 3,444,517 A | * | 5/1969 | Rabinow | 382/175 |
| 4,215,407 A | * | 7/1980 | Gomola et al. | 700/95 |
| 5,025,477 A | * | 6/1991 | Baitz et al. | 382/100 |
| 5,335,777 A | | 8/1994 | Murphy et al. | |
| 5,497,314 A | * | 3/1996 | Novak | 705/17 |
| 5,862,907 A | | 1/1999 | Taylor | |
| 6,860,381 B2 | | 3/2005 | Newsom et al. | |
| 7,263,409 B2 | | 8/2007 | LeVasseur et al. | |
| 7,382,895 B2 | * | 6/2008 | Bramblet et al. | 382/103 |
| 7,387,195 B2 | | 6/2008 | Bonham et al. | |
| 7,561,717 B2 | * | 7/2009 | Anderson | 382/101 |
| 7,741,575 B2 | * | 6/2010 | Bowers et al. | 209/584 |
| 8,027,427 B2 | * | 9/2011 | Basu et al. | 378/8 |
| 8,073,239 B1 | * | 12/2011 | Bahrami et al. | 382/143 |
| 2004/0144623 A1 | | 7/2004 | Newsom et al. | |
| 2006/0159306 A1 | * | 7/2006 | Anderson et al. | 382/101 |
| 2006/0159307 A1 | * | 7/2006 | Anderson et al. | 382/101 |
| 2006/0272929 A1 | | 12/2006 | Taylor | |

* cited by examiner

*Primary Examiner* — Manav Seth
(74) *Attorney, Agent, or Firm* — Alston & Bird LLP

(57) ABSTRACT

A decentralized tracking system is discussed herein. The decentralized tracking system can be comprised of two or more tracking elements and be used to track packages moving on a conveyor system. Each tracking element can operate independently, despite being highly sophisticated and dynamically coordinated with one or more other tracking elements. The conveyor system can be a modular and/or accumulation conveyor system that has sorting functionality. The decentralized tracking system can be used to divert packages for sortation by, for example, embedding a destination zone into the package's tracking data and/or preprogramming conveyor zones to sort specific packages based on a package identifier.

25 Claims, 15 Drawing Sheets

DECENTRALIZED TRACKING OF PACKAGES ON A CONVEYOR

TECHNOLOGICAL FIELD

This is directed to conveyor systems, and more particularly to systems, apparatuses, methods, and other means for tracking and sorting packages moving along conveyor systems.

BACKGROUND

Conveyor systems are commonly used to move packages for various reasons. For example, those in the manufacturing and shipping industries often use conveyor systems to physically move packages from one location to another within a warehouse, distribution center or airport. "Packages," as used herein, may include one or more boxes, crates, goods, containers, any other tangible item, or combination thereof.

It is often helpful to be able to track the flow of packages along a conveyor system. Movement characteristics, such as timing and positioning of each package, often need to be tailored to the needs of the particular manufacturer, shipper or, more generally, "user" of the conveyor system.

BRIEF SUMMARY

Discussed herein are methods, systems, apparatuses, computer readable products and other means for tracking a package on a conveyor system without needing a central processing center or any other central control component. The decentralized tracking system, methods, etc., can be implemented to track packages moving along any type of conveyor system, including a multi-zone, accumulating conveyor system.

The decentralized tracking system can include one or more tracking modules. A package, sometimes referred to herein as the "leading package" when it precedes another ("trailing") package in the conveyor line, is received into a first zone of the multi-zone conveyor. As used herein, zones refer to units of a conveyor system that move packages, while tracking elements refer to units of the decentralized tracking system that track packages. A tracking element is associated with and monitors an area of the conveyor system.

In many embodiments discussed herein, there is one zone per tracking element and each zone shares one or more components (such as a sensor or circuitry enclosure) with each tracking element. But in other embodiments, there are partial or multiple zones for each tracking element and/or each tracking element is physically and/or functionally independent from the components of each zone.

A tracking element can include, for example, a tracking module and one or more sensors. The tracking module can comprise circuitry, memory and/or any other component that can be configured to receive (or generate), among other things, tracking data associated with each package. The circuitry can store the leading tracking data in a "loading registry," as defined herein, which can be implemented using any type of memory component. The loading registry can be dedicated to storing tracking data associated with a package that is being or was detected by an upstream zone's sensor, tracking data that was generated by the zone's input device (e.g., bar code scanner, RFID reader, etc.), and the like. Tracking data can be any type of data, formatted in any manner, that represents the package and moves with the package through the tracking elements of the decentralized tracking system.

As the leading package moves through a zone, sometimes referred to as the "subject zone," the subject zone's sensor can detect the package. In response to the subject zone's sensor detecting the package (e.g., the leading package moving into the field of view of the subject zone's sensor), the tracking element's circuitry can receive position data, determine if an timing error is present, and, if not, reassign the leading package's tracking data ("leading tracking data") from the subject zone's loading registry to the subject zone's zone registry. In addition, the leading tracking data can be made available for uploading, and the downstream zone's tracking circuitry can download the leading package's tracking data into the downstream zone's loading registry. As used herein, the "zone registry" refers to a memory location for storing data that represents the package currently in the zone that is associated with the tracking element's circuitry, and the "loading registry" refers to a memory location for storing data that represents the package that should be leaving the upstream zone and/or approaching the subject zone's sensor.

The position data represents the position of the package at a given time. Position data can be generated, for example, in real-time or near real-time by a sensor that is positioned in the downstream portion of a zone. For example, position data can be generated subsequent to or concurrently with a sensor detecting the leading or trailing edge of the leading package.

A loading registry may be populated with the leading package data in response to, for example, an upstream zone's sensor detecting a package. The leading package data can be reassigned from the loading registry of the subject zone to the zone registry of the subject zone (sometimes referred to as the "subject zone registry") in response to a sensor in the subject zone detecting, e.g., the leading edge of the package. "Reassigning" as used herein and in the appended claims in connection with tracking data (e.g., first package tracking data, second package tracking data, package data, etc.) and registries of the same tracking element can include, for example, transferring the tracking data from the loading registry to the zone registry (which may include deleting from the loading registry and writing to the zone registry), reassigning a pointer associated with the tracking data (causing, e.g., the tracking data to be associated with a zone registry instead of a loading registry), re-classifying the one or more memory cells (from, e.g., loading registry to zone registry) in which the tracking data is stored, changing a read/write characteristic associated with the package data (e.g., making the tracking data readable and/or writeable, wherein the zone registry, but not the load registry, is one or more memory cells that are readable and/or able to be cleared), and/or performing any other operation that may be apparent to one skilled in the art when implementing an electronic data management system. After the reassign is complete, the tracking data can be erased from the subject load registry (if necessary).

In other embodiments, tracking data can be reassigned among registries and/or tracking elements, in response to a sensor detecting the trailing edge (as opposed to the leading edge) of a package. For example, the subject zone's circuitry can receive position data from, e.g., an upstream zone's sensor, wherein the position data indicates that the trailing edge of a package has moved past the sensor and, in response, package data is deleted from the upstream zone registry and/or reassigned from the subject zone loading registry to the subject zone registry.

In response to the adjacent downstream module's circuitry receiving the leading package's tracking data, the adjacent downstream circuitry can function any of the ways described above. This can be repeated as each package moves down the conveyor system.

In addition, the tracking data of one or more packages can be provided to any number or type of output devices, including display devices, mechanical transducers, personal computers (including the simpler netbook computers and/or handheld computers), and/or any other device. Mechanical transducers can be any type of device that generates a physical response to the tracking data and/or any other data, or derivative data thereof. A mechanical traducer can include, for example, redirection circuitry that can be configured to determine whether a particular package is to be redirected, generate a redirection command signal based on tracking and/or other data, send the redirection command signal to the mechanical transducer, determine that the package has been redirected to a new zone, instruct the tracking element's circuitry to send the tracking data to that new zone's tracking element, and cause the subject zone's tracking element to delete the tracking data from the subject zone's zone registry. For example, a zone identifier can be embedded in the tracking data (in addition to or as a parse-able part of the package identifying data), and when the package arrives at that zone, the zone's circuitry can determine it is identified in the tracking data and command the zone's redirection mechanism to redirect the package down a different path or branch of the conveyor system. As another example, a display device can be used to convert the tracking data into visual information that a user can comprehend (such as a light, textual information, image information, etc.) and initiate a manual sorting of the package (by, e.g., manually triggering a diversion device, physically removing the package by hand, and/or by any other means).

The decentralized tracking system can also include error response functionality. For example, after a package is removed from the conveyor unexpectedly or breaks (e.g., spills open) on the conveyor, the tracking system can detect that an error has occurred and, for example, purge the registries associated with the package, assign new tracking data to the package (and/or its contents), and/or associate an error flag (or other message indicator) with the package's tracking data. The new (or modified) tracking data can identify the package as an error package and be used to divert it and any other error package(s) to a designated area of the conveyor system. In some embodiments, all error packages are assigned the same error tracking data. In some embodiments, an alarm can sound and/or a log created at a central component.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DISCLOSURE

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
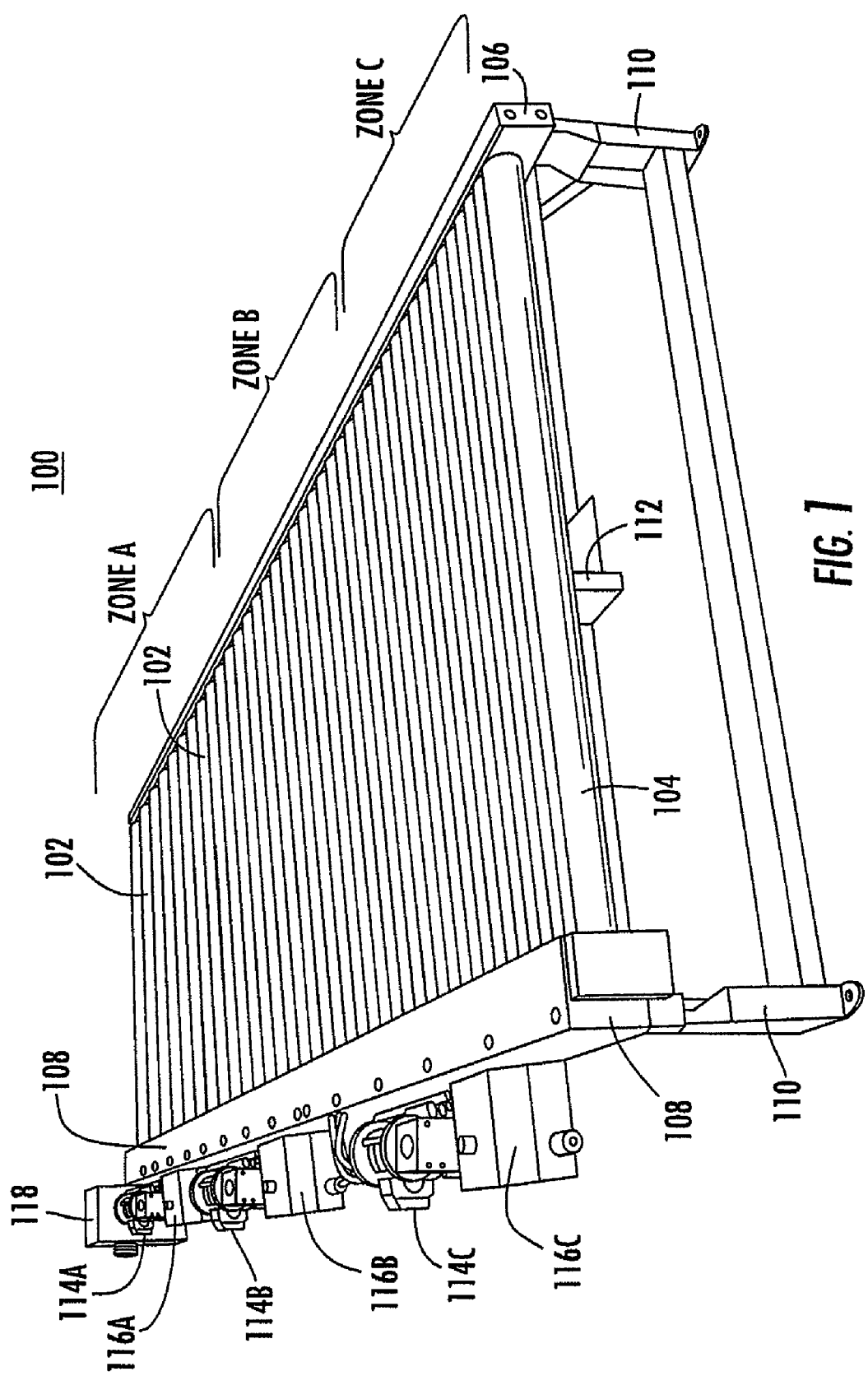
FIG. 1 shows an isometric view of an exemplary conveyor that can be used to implement some embodiments of the present invention.

FIG. 1 shows an isometric view of conveyor segment 100, which is a conveyor segment that can be used to move and track a package. As used herein, a "conveyor segment" is a portion of a conveyor system. Each conveyor segment includes, for example, at least one leg, support structure (e.g., side rails), conveyance component (e.g., motor), and conveyor surface. In addition, each conveyor segment can include one or more "tracking elements."

Each tracking element can include a tracking module and one or more sensors. The tracking module can be comprised of circuitry, memory and/or any other component that can be configured to receive, store, and upload, among other things, tracking data associated with a package on the conveyor surface.

The tracking module can store the leading tracking data in a "loading registry," as defined herein, which can be any type of memory component. The loading registry can be dedicated to storing tracking data associated with a package being detected by an upstream zone's sensor, and/or tracking data that was generated by the zone's input device (e.g., bar code scanner, RFID reader, etc.). The tracking data can be reassigned to a second registry, referred to herein as a "zone registry," in response to the tracking module determining that the package is located within a particular area of the conveyor system. Tracking data can be any type of data, formatted in any manner, that represents the package and moves through the decentralized tracking system's tracking elements as the package moves along the conveyor system's conveyor surface.

In some embodiments, the conveyor system's conveyor segments can be divided into zones, in which a driving force may be selectively applied by the conveying component to the conveying surface. The selective application of driving forces can cause each package to move (and stop) independently of other packages. In some embodiments, the conveyor segments can use the tracking element's sensor(s) and/or use their own segment sensor(s) to determine where the packages are and coordinate their movement.

The sensors can be any type of transducer or other device, such as a photo eye, that may determine the presence or absence of an item or package within each zone or other area of the conveyor system and transform that physical location information into electrical signals, called position data herein. When, for example, a sensor detects a package (or fails to detect a package) in its corresponding zone, circuitry can communicate with the upstream zone to activate its portion of the conveying surface and move the package held therein to the subject zone. As a result, packages may be accumulated in successive zones for eventual discharge from the conveyor. Additional details and examples are discussed in commonly-assigned U.S. Pat. No. 5,862,907, which discloses an accumulation conveyor system that is divided into a plurality of accumulating zones and is hereby incorporated by reference in its entirety.

Conveyor segment 100 can be any type of conveyor, such as, for example, a zero-pressure accumulation conveyor. Systems, methods and other aspects of zero-pressure accumulation conveyors are discussed in commonly assigned U.S. Patent Publication No. 2004/0144623, titled "Decentralized Drive System for a Conveyer," which is hereby incorporated by reference in its entirety.

Conveyor segment 100 includes conveying surface 102. FIG. 1 shows conveying surface 102 as being a series of rollers that includes roller 104. A package can be moved along the rollers in any manner. For example, each roller, or one out of every number (e.g., 2, 3, 4, etc.) of rollers, can be powered to rotate on command and be coated with or made from a non-slip surface (e.g., rubber, adhesive, etc.). Powering individual rollers is discussed further in U.S. Patent Publication No. 2004/0144623, which has been incorporated by reference in its entirety.

The rollers, including roller 104, can be rotatably supported between first side rail 106 and second side rail 108, which are in turn supported by legs 110. Center rail 112 can be positioned below the rollers and extend between and parallel to first side rail 106 and second side rail 108. Center rail 112 can be supported in any manner, including by a plurality of supports fixed to the underside of first side rail 106 and second side rail 108.

Some embodiments of the invention can also use one or more other forms of conveying surfaces instead of or in combination with rollers. Other types of conveying surfaces, which are not shown in the drawings, can include, for example, various types of belts and slats. Conveyor support frames may include different components for different types of conveyors. Many embodiments of the invention, including the decentralized tracking elements and methods, can be used with or adapted to any kind of conveying surface and, more generally, any kind of conveyor system.

Conveyor segment 100 is shown in FIG. 1 as a multi-zone conveyor segment. Conveyor segment 100 can be used with other conveyor segments (not shown). In other embodiments of the present invention, each conveyor segment can include only one zone. One or more multi-zone conveyor segments and/or single-zone conveyor segments can be coupled together (physically, wirelessly and/or electrically) to form the conveyor system. As discussed further below, each zone, each multi-zone conveyor segment, or a combination thereof can be outfitted with one or more tracking elements that implement the features of the decentralized tracking system.

The zones of each conveyor discussed herein are identified by letters. For example, conveyor segment 100 includes zone A, zone B and zone C. Zones A, B and C can function as accumulating zones, or any other type or combination of types of conveyor zones. The number of zones shown in any of the drawings or otherwise discussed herein is intended to be exemplary only. Many embodiments of the invention are intended to be implemented by any number of zones of the conveyor segment.

Sometimes the zones of conveyor segment 100 are referenced herein relative to how packages move through the zones into other zones of conveyor segment 100 or even neighboring conveyor segments of the conveyor system. For example, conveyor segment 100 can be configured to move packages from zone A, through zone B and into zone C. In this instance, zone B's adjacent upstream zone is zone A, and zone B's adjacent downstream zone is zone C. More generally, zone A can be referred to as being upstream from zone C and zone C as being downstream from zone A. In addition, because many embodiments of the tracking system are completely decentralized, it is helpful to focus some aspects of the discussion relative to a particular zone, which is sometimes referred to as the "subject zone." For example, if a package is physically located within or about to enter zone B, zone B can be referred to as the "subject zone." When zone B is the subject zone, the subject zone's "upstream zone" is zone A and the subject zone's "downstream zone" is zone C.

Two or more of the zones of conveyor segment 100 can, for example, work together as a single unit in moving various packages along conveyor segment 100. This type of coordination is useful when, for example, a package is longer than each zone that moves the package down conveyor segment 100. For example, the two zones can dynamically adjust their functionality to accommodate and move the larger package. Examples of systems, methods and other means for moving and dynamically accumulating packages on a conveyor are discussed in commonly-assigned U.S. Patent Application Publication Number 2006/0272929, published Dec. 7, 2006, which is incorporated herein by reference in its entirety. Similarly, in some embodiments, the different zone's tracking elements can, despite being decentralized, dynamically adjust their functionality to accommodate and track larger packages, even when such adjusted functionality was not needed (or not used) to track the previous (or leading), package on the conveyor (because the leading package was, e.g., physically smaller than the trailing package).

Each zone of conveyor segment 100 can include, among other things, a zone controller and one or more conveyance components, such as a drive motor, drive assembly, etc. Zones A, B, and C include drive motors 114A, 114B and 114C, respectively. Each of drive motors 114A, 114B and 114C also can include a drive shaft (not shown), and, in some instances, a gearbox or reducer (not shown) for reducing the output speed of the drive motor at the shaft. The reducer can also allow mounting of the motor at a right angle to the machine direction for a lower profile than a straight-mounted motor. Reducing the profile of the motor may help larger sized motors be included to drive higher conveyor loads.

Zones A, B and C of conveyor segment 100 are also shown as including zone controllers 116A, 116B and 116C, respectively. Drive motors 114A, 114B and 114C and zone controllers 116A, 116B and 116C are shown in FIG. 1 as being mounted to second side rail 108. In other embodiments, the drive motors and zone controllers can be mounted to any other part of conveyor segment 100. Each zone's controller is shown as being paired with the zone's drive motor. Additional details and examples of drive motors and zone controllers are discussed further in U.S. Patent Publication No. 2004/0144623, which has been incorporated by reference in its entirety.

A conveyance component of conveyor system 100 can also include a drive assembly having a non-slip coupling that connects the end of the motor shaft to a driven roller of the rollers. The non-driven rollers, or unpowered rollers, can be slaved to at least one driven roller by a chain drive system wherein individual chain loops can extend about sprockets fixed to adjacent pairs of the slaved rollers. In this manner, driving of the driven roller by one of drive motors 114A, 114B or 114C also drives the unpowered rollers and causes objects supported on the rollers to move in the downstream direction. With the use of alternative conveying surfaces, such as with belt conveyors, chain drives may be omitted, or optional. In a belt conveyor, the driven roller drives a belt wrapped around a second, non-driven roller and the length of belt between the rollers may define the zone. Such an alternative conveying surface, however, would still benefit from the use of a non-slip coupling which has several advantages independent of the type of conveying surface.

Regardless of the type of zones, number of zones or more broadly, how packages are moved, the conveyor can also be outfitted with decentralized tracking elements (and other components), which are discussed in greater detail below. The decentralized tracking elements (or any other means for implementing decentralized tracking functionality) can include a tracking module that can be integrated into, for example, one or more of zone controllers 116A, 116B and 116C, one or more self-contained tracking module enclosures, any other component (such as a sensor's circuitry enclosure), or a combination thereof. For example, conveyor segment 100 can include one zone (e.g., zone A) that has decentralized tracking functionality, while the other zones do not. As another example, all three zones of conveyor segment 100 can include decentralized tracking functionality.

Conveyor segment 100 can also include, for example, power supply panel 118 that is shown in FIG. 1 as being attached to second side rail 108 in zone A. Power supply panel 118 can include, among other things, circuitry to limit, disconnect, increase and/or store power for the operation of the components included in conveyor segment 100. Further details and examples of the functionality of drive motors, zone controllers, power supply panels and other components that can be included in conveyor segment 100 are discussed in commonly-assigned U.S. Publication No. 2004/0144623, which was already incorporated by reference in its entirety herein.

In addition to the tracking modules discussed herein, one or more other logic modules (not shown) can also be integrated into conveyor segment 100. The logic modules may include, for example, a microprocessor and other necessary hardware, software, firmware and other components that implement logic structure(s), which can perform the functions required to move a package in any number of ways, such as those discussed in U.S. Publication No. 2004/0144623 and, for example, commonly owned U.S. Pat. No. 5,862,907, which is also incorporated herein by reference in its entirety.

Other components and functionality, in addition to those discussed herein and in U.S. Publication Nos. 2004/0144623 and 2006/0272929 and U.S. Pat. No. 5,862,907, can also be included in one or more of the zones of conveyor segment 100. Some examples of such components and functionality are discussed further below. For example, although some of the embodiments discussed herein include tracking modules and/or computer-readable tracking products that are integrated into each zone's controller, the tracking functionality can also be implemented by one or more stand alone tracking conveyor elements that implement only the circuitry and functionality discussed in connection with, e.g., FIG. 3.

Figure 2:
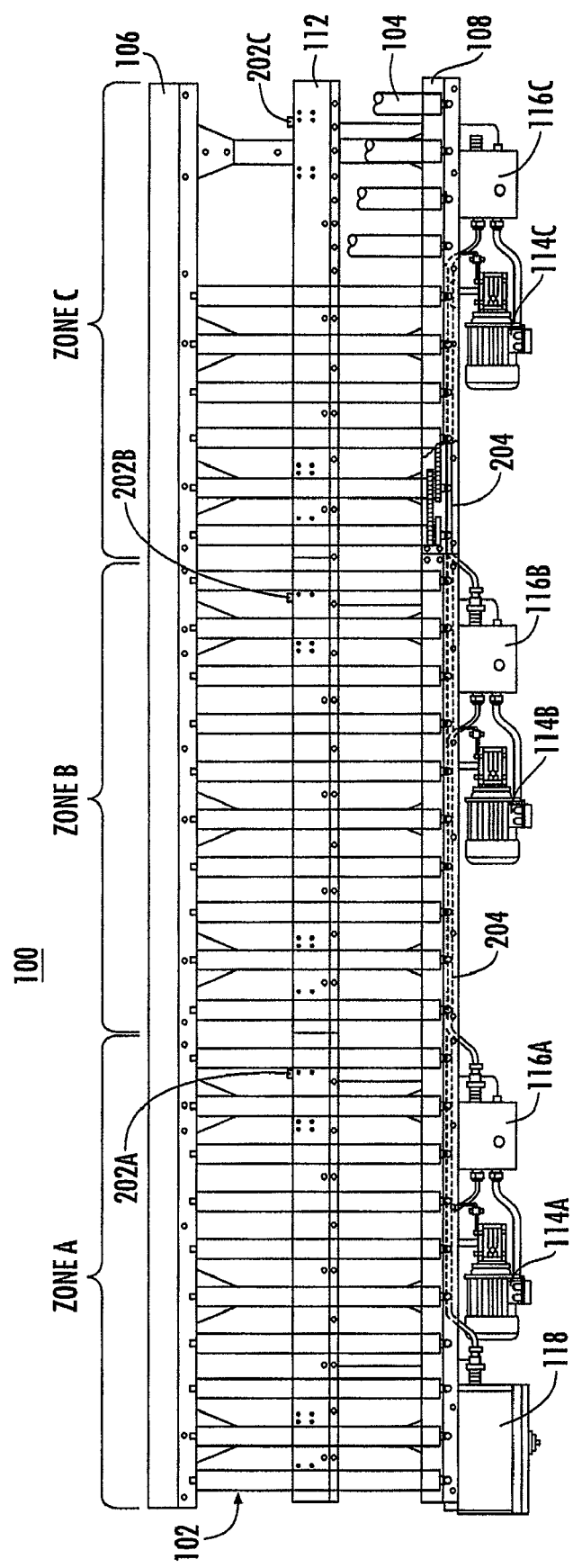
FIG. 2 shows a top view of an exemplary conveyor that can be used to implement some embodiments of the present invention.

FIG. 2 shows a view of conveyor segment 100. In addition to the components discussed in connection with FIG. 1 (which have the same reference numbers throughout), FIG. 2 shows sensor 202A, sensor 202B, sensor 202C, and cable 204.

In the depicted embodiment, each zone includes a sensor, positioned facing upward so that each sensor's field of view extends between a pair of the rollers. Each of sensors 202A, 202B, and 202C can be at least one photoelectric sensor, photo eye, proximity sensor, ultrasonic sensor, weight sensor, any other type of sensor, or any combination thereof that is capable of detecting a package on conveyor segment 100. Each of sensors 202A, 202B, and 202C can also be configured to transform physical location information into one or more signals representing conveyor position data of a package or portion thereof (referred to herein as "position data"). Sensors 202A, 202B, and 202C can be part of the tracking element associated with each zone.

Position data can include raw data generated by a sensor and/or other data that is a result of the raw sensor data being processed by circuitry (such as, e.g., a tracking module and/or a zone's control circuitry). The position data can then be provided to circuitry associated with each sensor's tracking element and/or zone, and/or each sensor's adjacent tracking element and/or zone(s). For example, each of sensors 202A, 202B, and 202C can be configured (e.g., wired, programmed, etc.) to communicate with its corresponding zone's control circuitry (i.e., zone controllers 116A, 116B and 116C, respectively). In some embodiments, sensors 202A, 202B, and 202C can also include the specialized circuitry, software, firmware and other hardware necessary to directly communicate with each other, as well as other components of the larger conveyor system such as another zone's controller and/or components not shown in FIG. 2. For example, zone B can be the subject zone, with zone C the adjacent downstream zone, and zone A the adjacent upstream zone. As the subject zone's sensor, sensor 202B can provide data to, for example, the subject zone's control circuitry (e.g., zone controller 116B) and/or the adjacent downstream zone's control circuitry (e.g., zone controller 116C).

In some embodiments, data generated by a zone is passed between the subject zone and its adjacent upstream and downstream zones. For example, the upstream zone (e.g., zone A) is only able to provide data to the subject zone (zone B) and is unable to provided data directly to the downstream zone (zone C). In some of these embodiments, the subject zone can relay the data from the upstream zone to the downstream zone (which may occur after, e.g., processing, storing, using, and/or performing any other action with the data). In addition, in some embodiments data can only flow in the direction of the packages. For example, if the conveyance system is only configured to move packages downstream, the tracking system can be configured to only move tracking data downstream.

Different types of sensors, and different types of conveying surfaces, may require different positioning of the sensors. For example, one or more of sensors 202A, 202B, and 202C may be mounted on first side rail 106 and/or second side rail 108, instead of center rail 112. If mounted on a side rail, the sensor could have a field of view in the cross-conveyor direction. Such side mounting would be advantageous when, for example, belt conveying surfaces are used with optical sensors, because the belt would otherwise block the view of a sensor mounted under the conveying belt surfaces.

In some embodiments, sensors 202A, 202B, and 202C can be used to generate tracking data. The tracking data can also be generated by another device and associated with the position data generated based on the output of one of more of sensors 202A, 202B, and 202C. For example, depending on the type of sensor that is used and/or where the sensor is positioned, sensor 202A can be used to determine whether a package is entering, within, and/or about to exit zone A of conveyor segment 100. A package is considered to be within a zone after it is determined that the package was received into a zone and/or before it is determined that the package has exited the zone or otherwise been removed from the conveyor surface. A package may be determined to be about to exit a zone, in response to, for example, the package's leading edge being detected by a sensor positioned near the downstream end of the zone. In addition, a package may be determined to have exited a zone and/or be received by the adjacent downstream zone after, for example, another package is detected by the sensor, a predetermined period of time has elapsed, a roller has turned a predetermined number of rotations, any combination thereof, and/or by any other means. In some other embodiments, for example, the sensor (which may be positioned near the downstream end of a zone) can be configured to detect the package's trailing edge and, in response, determine the package has exited the zone.

A sensor can also determine the position of the package based on a number of other factors (each of which can be preconfigured by a user, or automatically configured by the system), including the position of the sensor relative to the zone's boundaries, the size of the package, the velocity of the package (based on, e.g., how fast the rollers are moving), elapsed time algorithms, etc., or a combination thereof. In some embodiments of sensors 202A, 202B, and 202C, each of these determinations and other calculations are performed wholly within the sensor, using, e.g., specialized circuitry included in each sensor's electrical enclosure. In other embodiments, at least some of the calculations and determinations are performed outside of the sensor's enclosure, such as by one or more zone controller modules. In addition, an array of sensors can also be included in each tracking element (one sensor in the upstream portion of the tracking element, one sensor in the middle of the tracking element, and/or one sensor in the downstream portion of the tracking element), and output data into tracking element-dedicated control circuitry (such as circuitry 300 discussed in connection with, e.g., FIG. 3 below).

When the position of the package is determined, a position data signal can be generated in some embodiments (e.g., those that integrate the tracking element into the zone controller), and that signal can be sent to the sensor's corresponding zone controller (subject zone's zone controller, or "subject zone controller"). The subject zone controller can then send data—which can include the raw position data signal from the subject zone's sensor ("subject zone sensor"), other position-related data, and/or any other type of data—to the adjacent downstream zone's zone controller ("downstream zone controller"). In some embodiments, the position data signal can be sent directly to an adjacent zone's zone controller ("adjacent zone controller") that includes a tracking module. Like any other communication signals discussed herein, components of conveyor segment 100 (and the centralized components of the larger conveyor system) can communicate with each other using any means. For example, components (such as sensor 202A, zone controller 116A, sensor 202B and zone controller 116B) can directly communicate with each other wirelessly (using any wireless components and/or protocols such as, e.g., 802.11, BlueTooth®, etc.) and/or by using any type of physical connection (e.g., metallic wire, optical cable, etc.).

As referred to herein, "direct communication" refers to communications that occur between components of adjacent zones and/or segments, which are not routed through any central component (such as, e.g., a central processor or server). For example, cable 204 is included in FIG. 2 and is shown as being one or more physical cables that couple zone controller 116A to zone controller 116B, and zone controller 116B to zone controllers 116A and 116C. Cable 204 can include one or more types of signal paths (such as those discussed above) that can facilitate the transmission of one or more types of signals (e.g., electrical, optical, etc.). Additional signal paths (not shown) can also be included in conveyor segment 100, which allow the various components of conveyor segment 100 to communicate with other components and/or other conveyor segments of the conveyor system.

As such, each sensor can be in communication with its corresponding zone controller as well as the adjacent zone's or zones' corresponding zone controller(s) and/or any other component implementing a tracking module. In some embodiments, these communications can be direct from sensor to zone controllers, or indirect (e.g., routed through a centralized component). Another example of direct communications is when a sensor's corresponding zone controller is used to relay a signal, which was triggered or generated by the sensor, directly to another zone controller. Therefore, sensor 202A can communicate directly with zone controller 116A, which can in turn communicate with zone controller 116B. Or, sensor 202A can communicate directly with zone controllers 116A and 116B. The communications can include, for example, simple position data signals (e.g., a logical 1 or 0 indicating the presence or absence of a package or other sensor obstruction) to more complicated embedded-command position data signals that instruct one or more other components of the conveyor system to perform a task (such as, e.g., save data, enter a sensing mode, go into hibernation, etc.). In addition, other signals with varying complexity (such as, e.g., package identifying data signals) can also be generated by, reassigned among, and received at the components of conveyor segment 100 and the other parts of the conveyor system (some of which are not shown to avoid overcomplicating the drawings).

Figure 3:
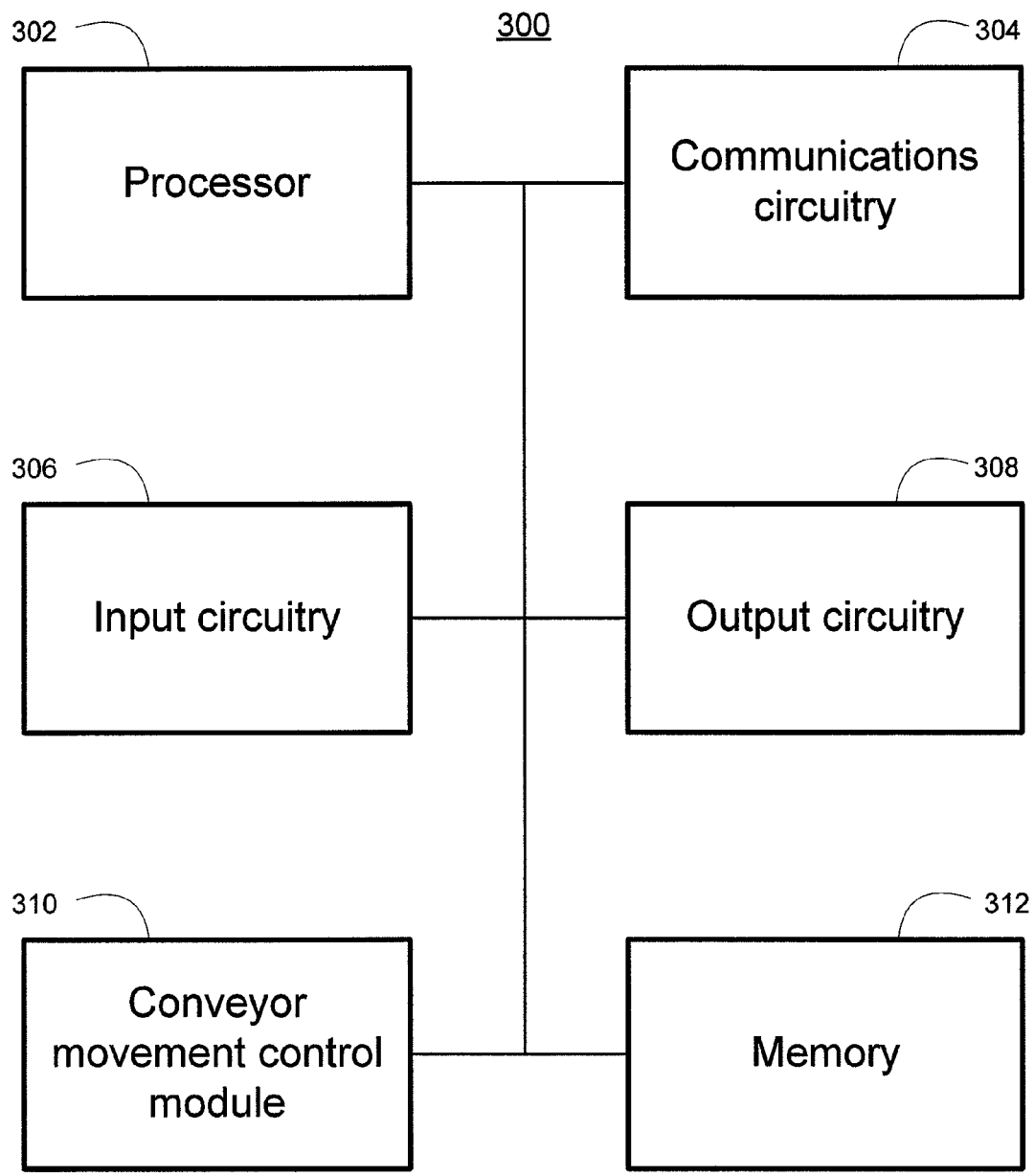
FIG. 3 shows a schematic diagram of exemplary circuitry that can be implemented in one or more components that are used to track packages moving along a conveyor in accordance with some embodiments of the invention.

FIG. 3 shows circuitry 300 that can be implemented in, for example, a stand alone tracking element enclosure and/or component of a conveyor segment (such as each of zone controllers 116A, 116B and 116C) discussed above, or distributed among different components of a conveyor segment (such as a zone controller, sensor, and/or tracking element enclosure). A stand alone tracking element enclosure may be used in, for example retrofit applications of existing conveyor systems. The tracking element may correspond with one zone of a multi-zone conveyor segment (such as conveyor segment 100), an entire multi-zone conveyor segment, multiple conveyor segments, any other portion of a conveyor system, and any combination thereof. Circuitry 300 can be designed to work directly with like circuitry and without a central component (i.e., a centralized component that communicates with more than two tracking elements). As such, circuitry 300 can function in a decentralized manner. Circuitry 300 can include processor 302, communications circuitry 304, input circuitry 306, output circuitry 308, conveyer movement control module 310, and memory 312. Circuitry 300 can be included in each tracking element of a conveyor system. Additional components, not shown in FIG. 3, can also be included in circuitry 300, such as, for example, a back-up power supply (e.g., solar, battery, etc.), an integrated input/output component (in addition to the circuitry shown), among others. Circuitry 300 can receive power from a power supply panel, such as power supply panel 118 discussed above.

Processor 302 can be any type of processing hardware (such as, e.g., a PIC® microcontroller) that controls and coordinates the functionality of the other electrical components included in circuitry 300 and external to circuitry 300. For example, processor 302 can be any type of circuitry that interprets instructions and executes program code. Processor 302 can use firmware and software as necessary. Processor 302 can also be configured specially for and/or made of specialized components to perform the functions consistent with those provided by embodiments of the present invention, such as the decentralized tracking of packages.

Communications circuitry 304 can enable the exchange of data (including commands) among the components of the conveyor system. For example, communications circuitry 304 can include one or more communications modules that can send and receive data via a wired or wireless signal path. Such communications can allow, for example, package tracking data, other identifying data, position data, and/or any other data to be sent to another component or received by circuitry 300.

Input circuitry 306 can include one or more different modules that enable circuitry 300 to interface with one or more input devices. Input devices, as referred to herein, are devices that a user or other machine may use to transform various physical stimuli (e.g., light, movement, pressure, etc.) into input data that can be used by the conveyor system. For example, a bar code scanner, RFID reader, sensor, keyboard, mouse, touch pad, etc. are all examples of input devices that can be coupled to input circuitry 306 of circuitry 300.

Output circuitry 308 can include one or more different modules that enable circuitry 300 to interface with output devices. Output devices, as referred to herein, are devices that a user or other machine may use to transform various data signals into user-comprehensible information or physical stimuli. Some examples of output devices include display device, audio speaker, flashing light, printer, package diverter, etc. One or more output devices, such as display devices, can be integrated into each zone, located every so many zones, and/or located at a central component.

Although conveyor movement control module 310 can be considered a type of output circuitry 308, it is shown separately in FIG. 3 to emphasize the importance of that specialized type of output circuitry in the context of a zoned conveyor system. Conveyor movement control module 310 can be used to facilitate the movement of packages within the zone (or other tracking element) that circuitry 300 is dedicated to serving and controlling. In other embodiments, such as those that separate the tracking functionality from the movement control functionality, movement control module 310 can be omitted from circuitry 300.

Memory 312 can be any type of storage device, including RAM, ROM, flash memory, magnetic memory, etc. Memory 312 can include portions dedicated to storing one or more package identifiers. Those portions can be distributed throughout memory 312, grouped together as continuous set of bits of memory, or combination thereof (e.g., each of the portions comprise bits grouped together, but the two portions are not physically near one another). For example, memory 312 can include at least two registries, wherein a first registry (sometimes referred to herein as the "zone registry") stores the package tracking data, including, e.g., package identifier, of the package currently in the zone or other portion of the conveyor monitored by the tracking element associated with circuitry 300. A second registry (sometimes referred to herein as the "loading registry") can store the tracking data of the package that was (or is) in the zone or other portion of the conveyor monitored by the adjacent upstream tracking element. As such, memory 312 of a plurality of decentralized tracking units can enable the flow of data about packages, as the packages move down the conveyor system.

The package tracking data (including package identifiers and any other data) can be any type of data formatted in any manner, which can be associated with a package moving along the conveyor. For example, the package tracking data can be as simple as a random number assigned to the package when the package is placed on the conveyor system. An infeed zone of the conveyor system, for example, may include a random number generator that generates a package identifier each time the infeed zone's sensor detects a new package.

In some embodiments, every tracking element of the tracking system (not only those used at infeed zones) can include the functionality of generating package tracking data in response to detecting a new package on the line (based on, for example, information or lack thereof received from an upstream zone's decentralized tracking module). For example, each new package placed on the conveyor will be given the same tracking data (as opposed to a random identifier) and sorted to the same destination (using, for example, the redirection process discussed in connection with, e.g., FIG. 5). The predetermined package tracking data can be determined automatically by the system or configured in response to a user input. (The package tracking data can include the same or different data as other package-related data.)

The package tracking data can also be based on a bar code, RFID tag or any other information specific to a particular package. In addition to package tracking data, additional (e.g., more detailed) package data can also be stored in memory 312. The tracking data can then be uploaded and download from the memory of each circuitry and follow the corresponding package down the conveyor system using the methods and conveyor segments described herein.

In some embodiments, the package tracking data (and/or other package information) can also be used to, for example, divert packages to a particular accumulating zone or sorting area as described below. For example, the package tracking data can include parse-able information that can be interpreted by a diversion zone's computer or other electrical component as a command for that diversion zone to be activated. The package identifier (and/or other package information) can also be presented to the user if an output device is coupled to output circuitry 308, and the user can, e.g., manually divert the package based on the package tracking data.

As mentioned briefly above, a tracking element, as referred to herein, is a unit of a decentralized tracking system, which can be dedicated to a partial zone, entire zone or multiple zones of a conveyor system. In some embodiments, for example, a multi-zone segment can include only a single tracking element of the tracking system. As such, the zones of the conveyor can be dedicated to moving packages, while each tracking element of the decentralized tracking system is dedicated to tracking one or more packages. For example, a three-zone conveyor segment can include only one sensor and only one tracking module and, therefore, be only one tracking element of the decentralized tracking system.

One skilled in the art will appreciate that all the circuitry and modules described herein are not required for the decentralized tracking system to function in accordance with embodiments of the invention. For example, output circuitry 308 can be omitted. As another example, communications circuitry 304 can be omitted, especially in embodiments that hardwire the sensor to the tracking circuitry of the subject zone and the tracking circuitry of the adjacent downstream zone. In such embodiments, the sensors can produce, for example, relatively simple sensor outputs (e.g., logical 1 or 0) that represent whether or not a package is obstructing the sensor's field of view.

Figure 4A:
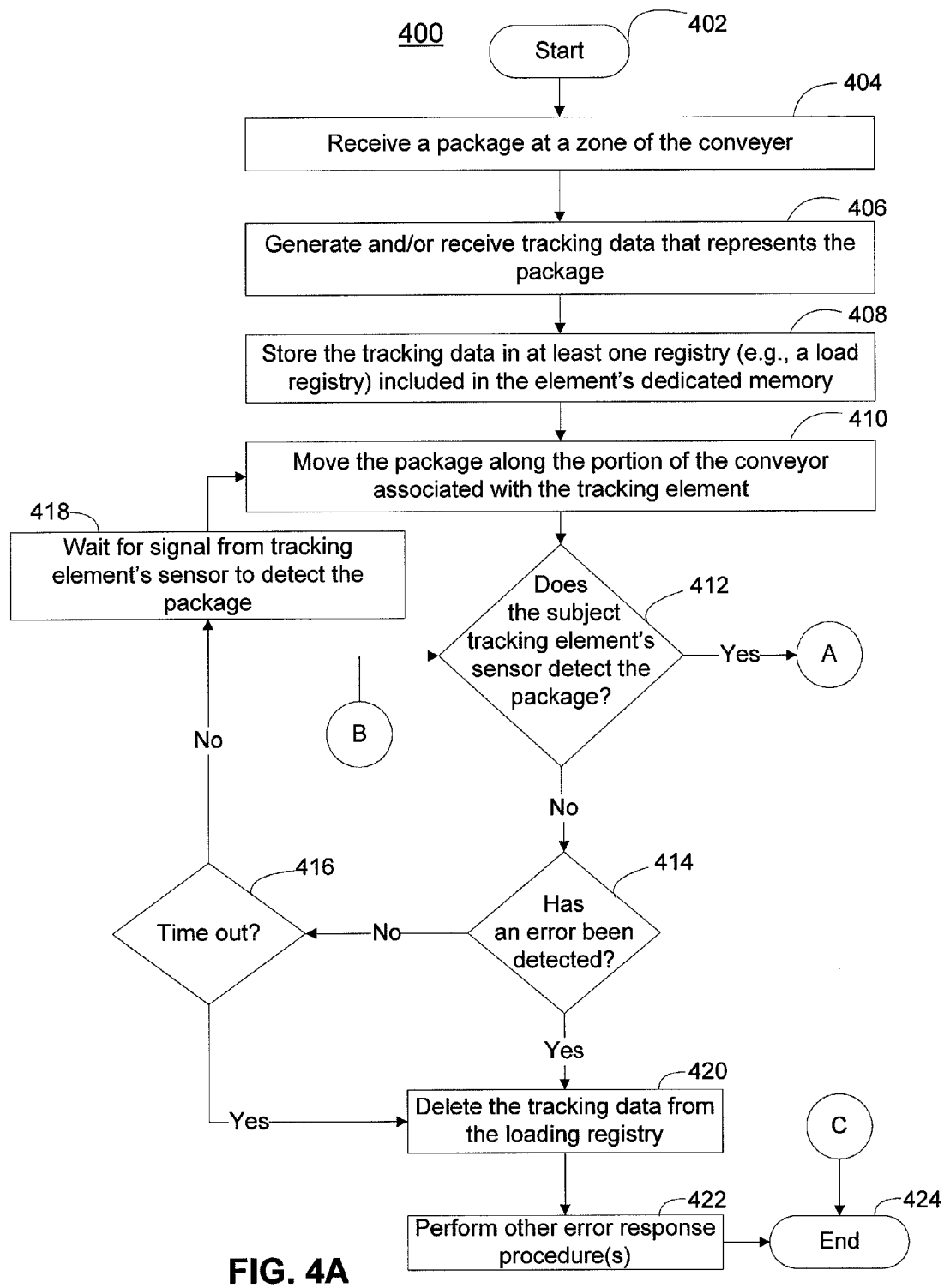
FIGS. 4A-4B and 12A-12C show an exemplary process for tracking a package that may be performed by decentralized tracking systems structured in accordance with some embodiments of the invention.
Figure 4B:
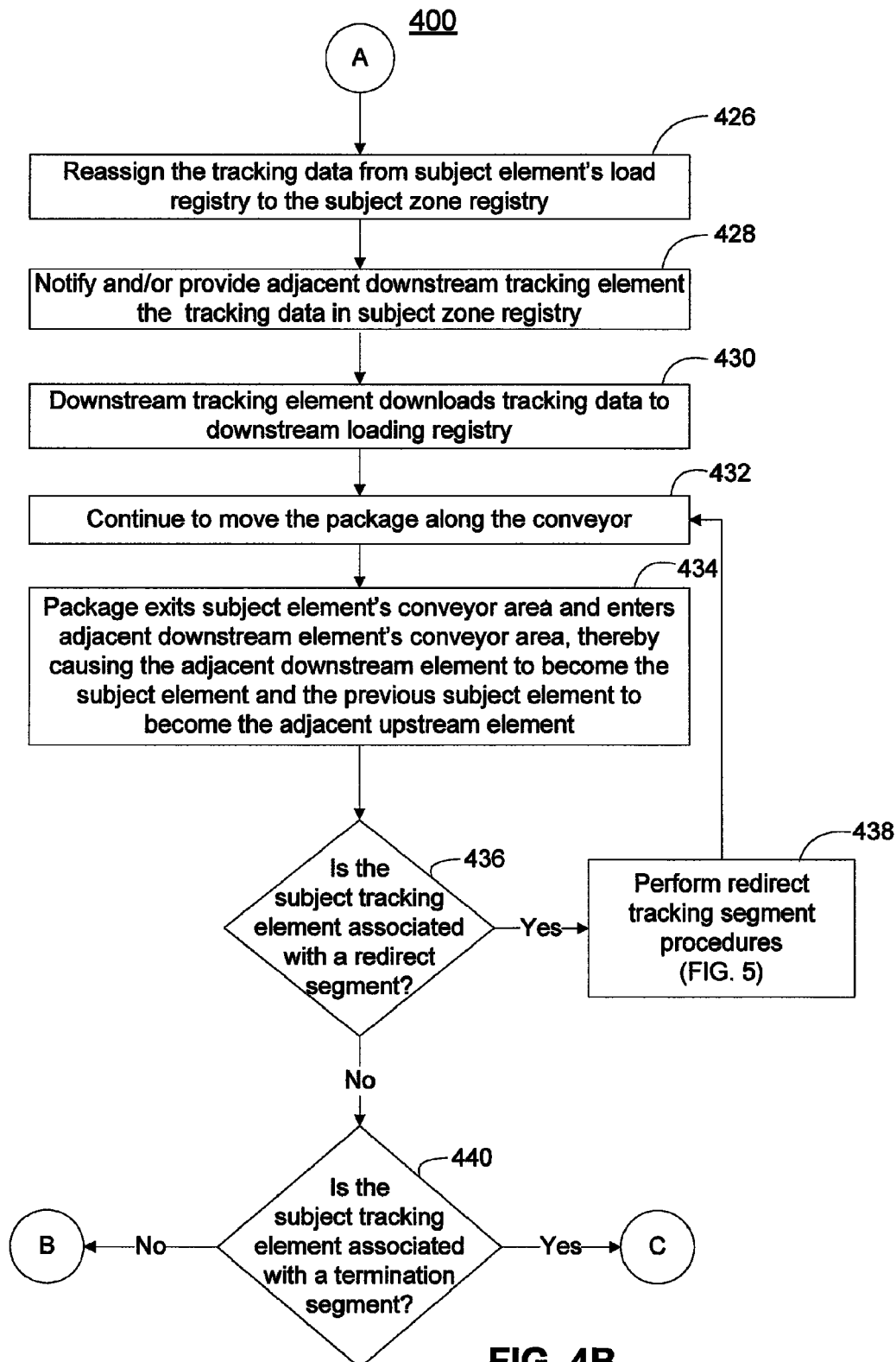
Figure 5:
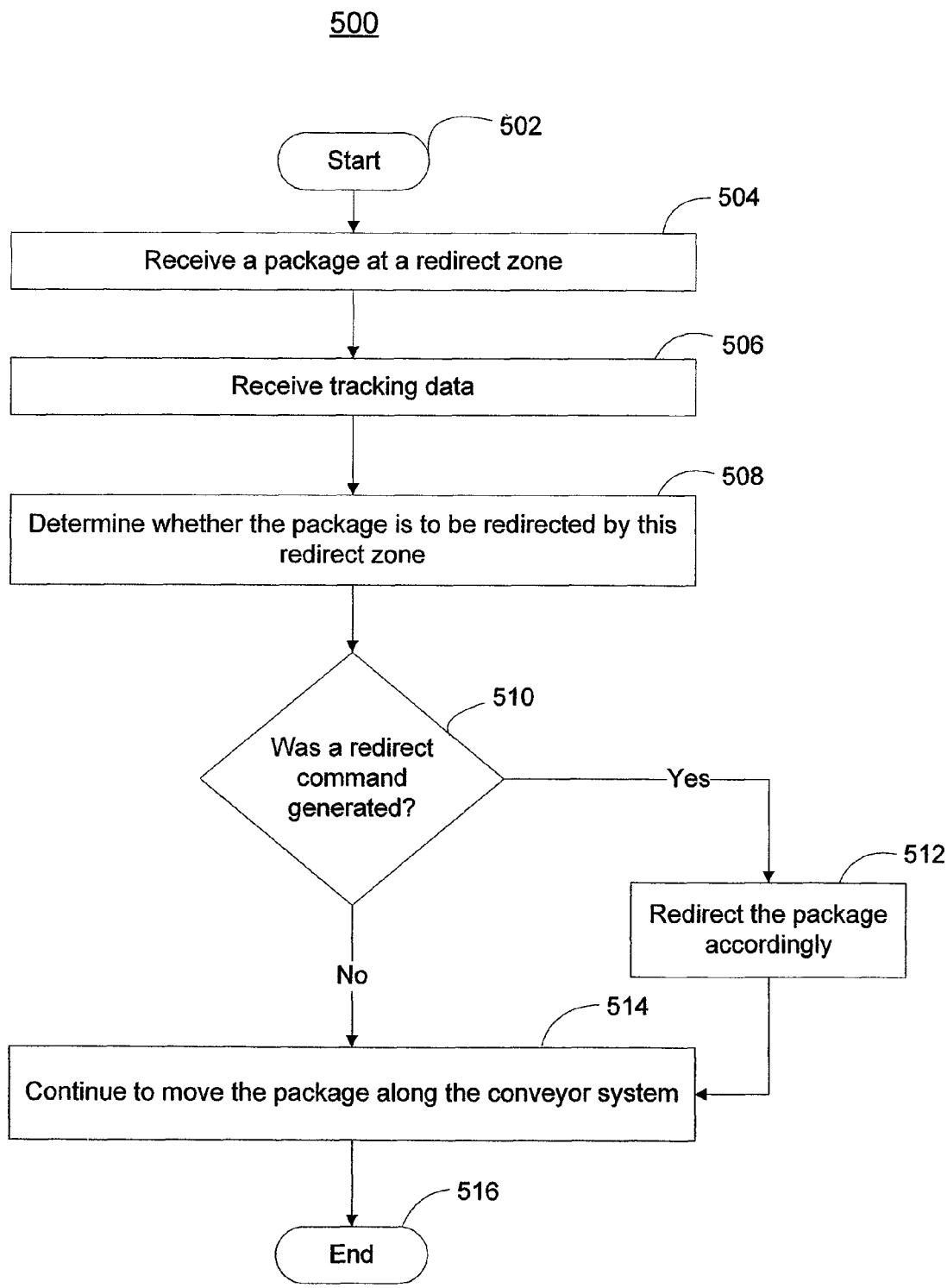
FIG. 5 shows an exemplary process for diverting packages moving on a conveyor that may be performed by decentralized tracking systems structured in accordance with some embodiments of the invention.

FIGS. 4, 5 and 12 described below are flowcharts of a conveyor segment, method and computer program product according to exemplary embodiments of the invention. It will be understood that each block or step of the flowchart, and combinations of blocks in the flowchart, can be implemented by various means, such as hardware, firmware, and/or software including one or more computer program instructions.

For example, one or more of the procedures described herein may be embodied by computer program instructions. In this regard, the computer program instructions that embody the procedures described herein may be stored by a memory device of each decentralized tracking module (e.g., memory 312) and executed by a processor in the decentralized tracking module (e.g., processor 302). As will be appreciated, any such computer program instructions may be loaded onto a computer or other programmable conveyor segment (e.g., hardware) to produce a machine, such that the instructions that execute on the computer or other programmable conveyor segment create means for implementing the functions specified in the flowchart block(s) or step(s). These computer program instructions may also be stored in a computer-readable memory that can direct a computer or other programmable conveyor segment to function in a particular manner, such that the instructions stored in the computer-readable memory produce an article of manufacture including instruction means which implement the function specified in the flowchart block(s) or step(s). The computer program instructions may also be loaded onto a computer or other programmable conveyor segment to cause a series of operational steps to be performed on the computer or other programmable conveyor segment to produce a computer-implemented process such that the instructions executed on the computer or other programmable conveyor segment provide steps for implementing the functions specified in the flowchart block (s) or step(s).

Accordingly, blocks or steps of the flowcharts discussed herein may support combinations of means for performing the specified functions, combinations of steps for performing the specified functions, and/or combinations of program instruction means for performing the specified functions. It will also be understood that one or more blocks or steps of the flowchart, and combinations of blocks or steps in the flowchart, may be implemented by special purpose hardware-based computer systems that perform the specified functions or steps, or combinations of special purpose hardware and computer instructions.

In an exemplary embodiment, a conveyor segment for performing the methods of FIGS. 4, 5 and 12 below may comprise multiple processors (one or more of which can be, e.g., processor 302) configured to perform some or each of the operations described below. The processor may, for example, be specifically configured to perform the operations by performing hardware implemented logical functions, executing stored instructions, or executing algorithms for performing each of the operations. Alternatively, the conveyor segment and/or tracking system may comprise means for performing each of the operations described herein. In this regard, according to exemplary embodiments, examples of means for performing the steps below may comprise, for example, processor 302 and/or an algorithm executed by processor 302 for processing information as described herein.

FIGS. 4A-4B show exemplary process 400 for tracking a package. Process 400 is structured such that it may be performed by decentralized tracking systems configured in accordance with some embodiments of the invention. The tracking system is decentralized in that the tracking elements of the tracking system do not need use a central control component. Data is passed from the circuitry in a subject tracking element to the circuitry in the adjacent downstream tracking element. Data can also be passed from the circuitry in the subject tracking element to the circuitry in the adjacent upstream tracking element.

A centralized component can be used, in some embodiments, to compliment, enhance, and/or provide additional advanced functionality to the decentralized tracking system. For example, one or more central components (e.g., central processing center, server, and storage component) can be used to serve and store sorting data and more detailed package information (more detailed than what the decentralized tracking system uses to track a package).

Process 400 starts at step 402 and proceeds to step 404. At step 404, the package is physically received at a zone or other portion of the conveyor system. The zone that receives the package can be a zone specifically designated and configured as an infeed zone, which has one or more additional input devices, such as a barcode scanner or RFID reader. Alternatively, the zone that receives the package could be any type of zone (including a mid-conveyor transfer zone) of the conveyor system.

Next is step 406 at which tracking data is generated and/or received by the subject element's circuitry. The tracking data represents the package received at step 404. Further to the other discussion herein, the tracking data can include, for example, a package identifier and/or more detailed package information. The tracking data can be generated by a random number generator included in, for example, the tracking module (in response to, e.g., a sensor detecting a new, unidentified and/or unexpected package), by an input device that is coupled to the tracking module, or by any other means.

The tracking data is stored in memory at step 408. The memory can be dedicated to the tracking element (e.g., store data only pertaining to that one tracking element) and include at least one registry. For example, the tracking data may be initially stored in one or more memory cells, referred to herein as a load registry, which is dedicated to storing tracking data of the package that is moving towards the subject element's sensor. Each registry discussed herein can be any size, ranging from relatively small (e.g., 1-16 bytes), such as four bytes, to relatively large (e.g., 40 or 80 GB or larger). The tracking element's processor can also be programmed to dynamically allocate the size of each registry based on the amount of storage space remaining, amount of package-specific data being received, the importance of the particular package or package data, etc.

At step 410, the package is physically moved along the portion of the conveyor associated with the subject tracking element. The tracking of the package is dependent on the package's movement and, in some embodiments, vice-versa. Accordingly, the package can be moving while any step of process 400 (or any other process discussed herein) is occurring. Each decentralized tracking module can be configured to, for example, actively monitor packages and sample the conveyor frequently enough to avoid losing and/or failing to detect a package because the package is moving too quickly along the conveyor.

At step 412, the processor of the decentralized tracking module determines whether or not the subject element's sensor detects the package. In the embodiments that use a sensor at step 406 to also trigger the generation of tracking data (by a random number generator or in response to an error), the sensor being queried at step 412 can be the same sensor or a different sensor. The sensor that is queried at step 412 can be, for example, positioned closer to the downstream end of the tracking element (e.g., within the downstream third or quarter, or within 1-12 inches of the end of the conveyor portion assigned to the subject tracking element), whereas the sensor that initiates the generation of the tracking data can be at the upstream end of the tracking element (e.g., within the upstream third or quarter, or within a few inches of the beginning of the tracking element). The positioning of the sensor(s) can also be dependent on the size of packages and size of tracking elements and/or zones, and may be consistent or varied throughout the conveyor system.

In response to determining at step 412 that the package is undetected by the sensor (e.g., a visual sensor is unobstructed), process 400 proceeds to step 414 and determines if an error has occurred and/or been detected. In response to determining that no error has been detected (or occurred) at step 414, process 400 proceeds to step 416, and a determination is made as to whether or not the processor has been waiting too long to for the package. The amount of time a processor should wait (timeout period) can be preconfigured by a user or dynamically determined based on, e.g., the velocity of the conveyor, the size of the packages, the number of roller rotations, etc. If the processor determines it should continue to wait, process 400 proceeds to step 418.

At step 418, the processor of the subject tracking element waits to receive a signal (such as a sensor signal and/or other position data) that causes the processor to confirm that a package has arrived.

In response to determining at step 416 that the timeout period has expired or in response to determining at step 414 that an error has been detected (e.g., a package was detected prematurely, indicating that something was added to the conveyor in the middle of the line, or a determination was made that the package was prematurely removed from the conveyor), process 400 proceeds to step 420. At step 420, which is an example of an error correction step, the tracking data is deleted from the subject element's loading registry. The tracking data can then be replaced with error data, which can allow the decentralized tracking system, users, and/or external systems to determine which packages experienced an error while moving along the conveyor. Some examples of events that can be interpreted by the tracking system as errors are, e.g., a package spilling its contents on the conveyor, a package being removed from the conveyor, an unidentified package being detected, etc.

Next is step 422, at which other error correction steps, such as response procedure(s), can be performed. For example, an alarm may sound, new tracking data (such as error data) may be generated and sent upstream (or to a central component), an error message and/or other record may be created and stored in the tracking module's memory or at a central database, a wireless phone call could be made, the conveyor line may be stopped, etc. Process 400 then ends at step 424.

Returning to step 412, in response to determining that the subject element's sensor is detecting a package, process 400 proceeds to step 426 of FIG. 4B. The tracking data is reassigned at step 426 from the subject element's load registry ("subject load registry") to the subject element's zone registry ("subject zone registry"). "Reassigning" as used herein and in the appended claims in connection with tracking data (e.g., first package tracking data, second package tracking data, package data, etc.) and registries of the same tracking element can include, for example, transferring the tracking data from the loading registry to the zone registry (which may include deleting from the loading registry and writing to the zone registry), reassigning a pointer associated with the tracking data (causing, e.g., the tracking data to be associated with a zone registry instead of a loading registry), re-classifying the one or more memory cells (from, e.g., loading registry to zone registry) in which the tracking data is stored, changing a read/write characteristic associated with the package data (e.g., making the tracking data readable and/or writeable, wherein the zone registry, but not the load registry, is one or more memory cells that are readable and/or able to be cleared), and/or performing any other operation that may be apparent to one skilled in the art when implementing an electronic data management system. After the reassign is complete, the tracking data can be erased from the subject load registry (if necessary).

If a downstream package's tracking data is stored in the subject zone registry when the current package arrives at the sensor, the reassigning at step 426 may also include the tracking circuitry overwriting (e.g., deleting) the residual tracking data, and replacing it with the tracking data stored in the subject load registry. In other embodiments, such as the one discussed in connection with Zone 2 and FIGS. 10A and 10B, a subject zone registry can be purged of a package's tracking data in response to the subject zone's sensor no longer detecting (or detecting the trailing edge of) the package (which may be, among other things, before the package moves downstream from the subject zone).

Next is step 428, at which the circuitry of the subject tracking element notifies and/or provides the downstream tracking element that the tracking data is ready for upload. For example, a signal and/or the tracking data can be sent to downstream tracking element. Each tracking element's communications circuitry can help facilitate the sending and receiving of data, including any handshaking, authorization and/or authentication that may need to take place before data is exchanged. Other components, such as an external computer, display device, and/or anything else can also be notified of the availability of the tracking data.

At step 430, the downstream tracking element can download the tracking data into its loading registry from the subject zone registry. In some embodiments, the tracking data will remain in the downstream loading registry until the downstream sensor detects the package, until the downstream circuitry determines that an error has occurred, and/or until a time out determination has been made. The package continues to move at step 432 along the subject tracking element's portion of the conveyor (e.g., the subject zone).

At step 434, the package exits the subject zone and enters the adjacent downstream element's zone (or, more generally, monitoring area of the conveyor), thereby causing the adjacent downstream element to become the subject element relative to that package. In addition, since the package has moved downstream, the ex-subject element becomes the adjacent upstream element relative to that package.

Next is step 436, at which a determination is made as to whether the new subject tracking element (i.e., the receiving tracking element from step 424) is an associated with a segment of the conveyor that is used to redirect packages. A redirect tracking element can be implemented at redirect segments and be specially configured to, for example, upload (or make available for upload) the tracking data to an external device (such as a netbook that has Internet access). Redirect tracking elements can be especially useful for enabling the tracking data to follow a package as the package is sorted and/or distributed among various locations.

If the adjacent downstream tracking element is a redirect tracking element, process 400 proceeds to step 438 and the appropriate redirect procedures can be executed. An example of such a procedure is discussed further in connection with, e.g., FIGS. 5 and 11. After step 438, process 400 returns to step 432.

In response to determining the adjacent downstream tracking element is not a termination tracking element (but, e.g., another transfer tracking element), process 400 returns to step 412 of FIG. 4A and a determination is made as to whether the subject sensor detects the package.

In response to determining at step 436 that the adjacent downstream tracking element is not a redirect tracking element, process 400 proceeds to step 440. If, at step 440 a determination is made that the adjacent downstream zone is a termination tracking element, i.e., a tracking element that concludes a portion of the conveyor system, process 400 returns to step 424 of FIG. 4A and ends.

FIG. 5 shows process 500, which is an example of some steps that can be used at step 438 of FIG. 4B in response to determining the package is about to enter a redirect zone of the conveyor system. Process 500 starts at step 502.

Next is step 504 at which the package is received into the redirect zone, which can be used to divert and sort packages. For example, as a package is traveling down the conveyor system, the package may reach an intersection to at least one other branch of the conveyor section. The package can be redirected using any type of component or redirection unit (e.g., pusher arm unit, gravity chute, track switching unit, etc.) known in the conveyor arts. In addition, modules of the decentralized tracking system of the present invention can be configured to control such redirecting and sorting components by generating and sending redirect commands that are received by the redirection components.

In such embodiments, the redirection components can be considered examples of output devices that can interact with the decentralized tracking circuitry. Moreover, such commands can be transformed into physical action and redirection of a package on a conveyor system. For example, any type or combination of mechanical transducers, including driver components, motors, etc., that convert electrical, optical or other data into a mechanical/physical activity for moving (e.g., redirecting, sorting, etc.) packages can be activated to move a package in response to the redirect command(s). In other embodiments, the decentralized tracking module (included in the tracking elements of the conveyance segments) can be omitted from a redirection zone, and the circuitry of the redirection zone can be configured to interpret the signal sent from the upstream zone's tracking element and/or the signal can be formatted in a manner that the redirection zone's circuitry can interpret and respond accordingly.

At step 506 the tracking data associated with the package is received by, for example, the processor of the tracking element's tracking module. The tracking data can then be stored in a registry or any other type of memory unit in any suitable format (such as any other tracking element discussed herein). In some embodiments, the redirection circuitry (in addition to or instead of the tracking element's memory) receives the tracking data and stores it accordingly. The tracking data can be stored locally at the diversion unit and/or tracking element.

In some embodiments, the tracking data can be stored at a central database, which indirectly links, for example, all of the redirection zones' circuitry together. As such, one or more of the tracking elements that comprise the decentralized tracking system can upload data into a central storage device, via a central data server, and also download data therefrom for the narrow purpose of sorting packages. Central servers, central databases and other components can help, in some embodiments, the redirecting of packages moving along a conveyor, while enhancing the decentralized functionality of the tracking system discussed herein.

At step 508, a determination is made as to whether or not the package is to be diverted by its current redirection zone (as opposed to a redirection zone further down the conveyor line). The determination at step 508 can be made in any suitable manner. For example, the tracking data can include, embedded within in it and parsed out of it, redirection data that causes a redirection command to be outputted by the tracking module and/or the redirection circuitry. The embedded redirection data (e.g., a destination code identifier) can be, for example, a zone identifier associated with the redirection zone at which the package is to be redirected, a destination address associated with the redirection zone, any combination thereof, and/or anything else.

As another example, the tracking module and/or the redirection circuitry can communicate with at least one remote device (such as, e.g., a central processor, server and/or database), any of which can compare the tracking data (such as the package identifier) with redirection data it has access to, and determine whether or not the package should be redirected. That is, the package identifier can be compared with a list of package identifiers meant to be redirected at the current redirection zone and, if there is a match, a redirection command is generated. The list of packages can be stored as a look up table or as any other format. In some embodiments, a list can be downloaded and/or stored in each decentralized tracking module.

At step 510, a determination is made as to whether a redirection command has been generated (based on, e.g., the data gathered at step 508). In response to determining that a redirection command has been generated, after step 510 is step 512 and the package is redirected accordingly. Subsequent to being redirected, the package can arrive at a termination zone or move along, at step 514, to a new branch of the conveyor system.

In response to determining that a redirection command was not generated, step 514 follows step 510 and the package continues to move along the conveyor system without being redirected. Process 500 ends at step 516.

FIGS. 6-10 show how some embodiments of the decentralized tracking system can track multiple packages moving down a multi-zone conveyor system. While FIGS. 4-5 are generally discussed from the perspective of a package moving through the tracking elements, FIGS. 6-10 are generally discussed from the perspective of the tracking elements tracking the packages.

FIGS. 6-10 show a relatively simple embodiment of a decentralized tracking system, system 600, which includes tracking modules that implement some of the steps of the methods discussed herein. In particular, system 600 is shown throughout FIGS. 6-10 as tracking three separate packages moving along two conveyor segments of a conveyor system. The first conveyor segment is shown as having three-zones (such as, e.g., conveyor segment 100 discussed above) and the second conveyor segment (Zone 2) is shown as having only one zone. As shown in FIGS. 6-10, each zone of the conveyor system also includes a tracking element of system 600.

Figure 6A:
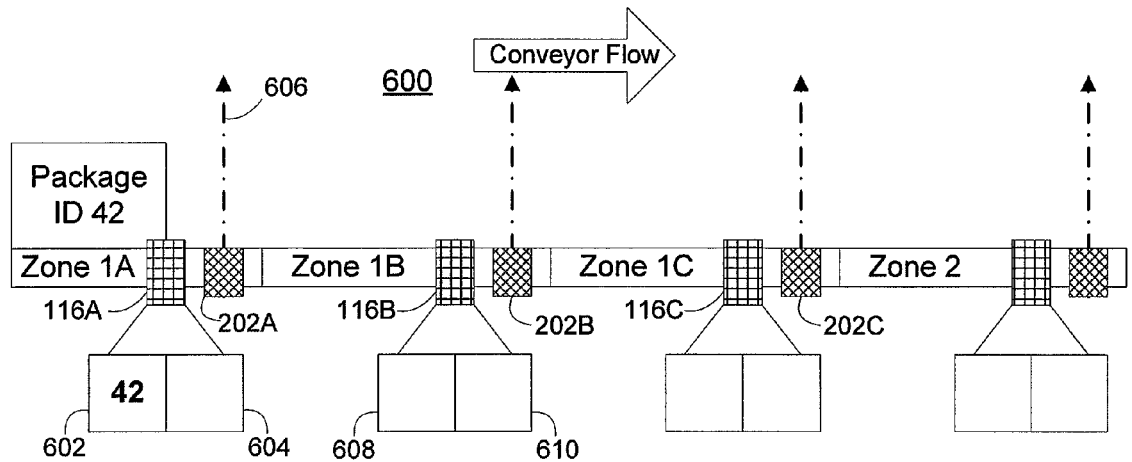
FIGS. 6-11 show exemplary methodologies of tracking of multiple packages that may be implemented by decentralized tracking systems structured in accordance with some embodiments of the invention.

In FIG. 6A, Zone 1A is shown for illustration purposes as an infeed zone. The decentralized tracking system may operate the same or slightly differently at an infeed zone than at, for example, a transfer, termination or redirect zone. At infeed zones, for example, all of the tracking zone's registries can be configured to be populated by the current package's tracking data. Accordingly, FIG. 6A shows Zone 1A receiving package 42 and storing the package identifier 42 as the tracking data in loading registry 602. (The term "registry," as mentioned above, is used herein includes any type of memory unit or units that can store tracking data and other package-related data, and is not limited to any common denotation of the word.) In other embodiments (not shown), each decentralized tracking module, instead of being generic to all zones, can be designed specifically for implementation of a particular type (e.g., an infeed zone) or types of zone and may include, for example, only one registry, such as zone registry 604. As mentioned above, the registries, tracking modules, and other tracking-related components can be incorporated into another component of the conveyor system, and/or a conveyor segment of the conveyor system. FIGS. 6-10 show the tracking components being incorporated into each zone's zone controller, such as, e.g., zone controller 116A for Zone 1A. As such, registries 602 and 604 of the memory included in zone controller 116A represent portions of its memory that store tracking data, and the information ("42") in the registries represents machine readable data.

As package 42 moves downstream, sensor 202A is configured to detect package 42 (such as, for example, its leading edge) as the package 42 moves into sensor 202's field of view. For simplicity, sensor 202's field of view is depicted as a straight line and shown as field of view 606. One skilled in the art would appreciate that different kinds of sensors may have different fields of view (i.e., fields of view that are, for example, more cone shaped, planar, or cylindrical, than linear).

Figure 6B:
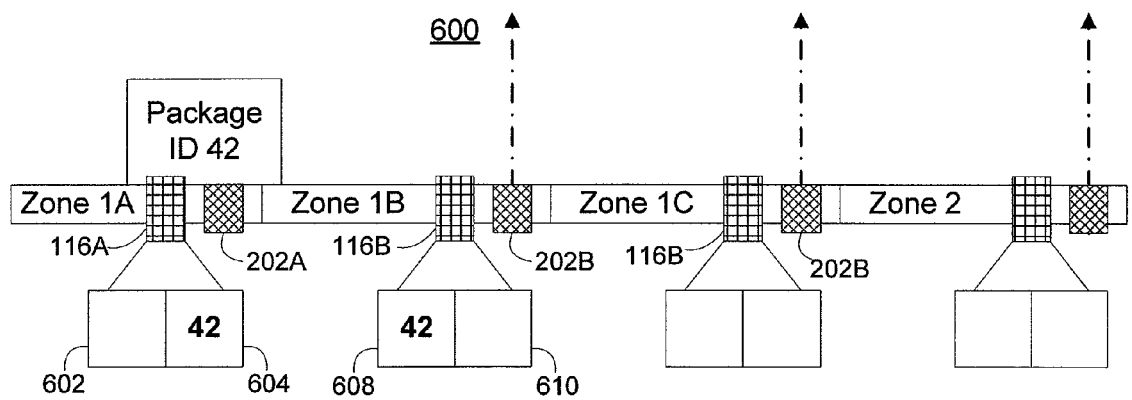

In response to detecting package 42, sensor 202 can signal zone controller 116A that package 42 has been detected or, more generally, that sensor 202 is detecting something in field of view 606. In response to receiving the signal (e.g., receiving position data) from sensor 202, zone controller 116A can update Zone 1A's registries. For example, the tracking data "42" can be reassigned from loading registry 602 to zone registry 604, as shown in FIG. 6B.

In alternative embodiments, such as those implementing a specialized infeed zone, Zone 1A can automatically populate zone registry 604 when a package is initially added to the conveyor system, and the data reassign from load registry 602 to zone registry 604 may not be necessary. In other words, zone registry 604 of Zone 1A would not need to be updated in response to sensor 202A detecting a package.

The adjacent downstream zone, Zone 1B, can also be notified of package 42's position. For example, zone controller 116A, sensor 202A, or a combination thereof can communicate position data associated with package 42 to zone controller 116B. The data communications, like any data communication discussed herein, can be very simple (e.g., only a logical 1 or 0), relatively simple (e.g., a few bytes of data that represent simple package identifier information and/or position data), relatively complex (e.g., diversion location data with embedded commands to be used by the conveyor system), more complex (package history movement, final destination, contents, insurance information, other general package information, etc.), dependent on the type of data, dynamically determined, or a combination thereof.

For example, zone controller 116B may receive a logic signal (e.g., position data) from sensor 202A that notifies zone controller 116B of package 42's position in the upstream zone. In response to receiving the logic signal, zone controller 116B can request and subsequently receive the tracking data (and/or other data) from zone controller 116A. In the embodiments depicted in FIG. 6B, zone controller 116A transmits a notification signal to zone controller 116B, causing zone controller 116B to populate its loading registry, loading registry 608, with machine readable tracking data that is associated with package 42. It is sometimes referred to as "stage 1" when an upstream zone (Zone 1A) notifies a subject zone (Zone 1B) that a package is en route. The notification signal can include, for example, tracking data, a command to the downstream zone to download the tracking data, and/or any other type of signal that can be sent over a physical or wireless connection.

Figure 6C:
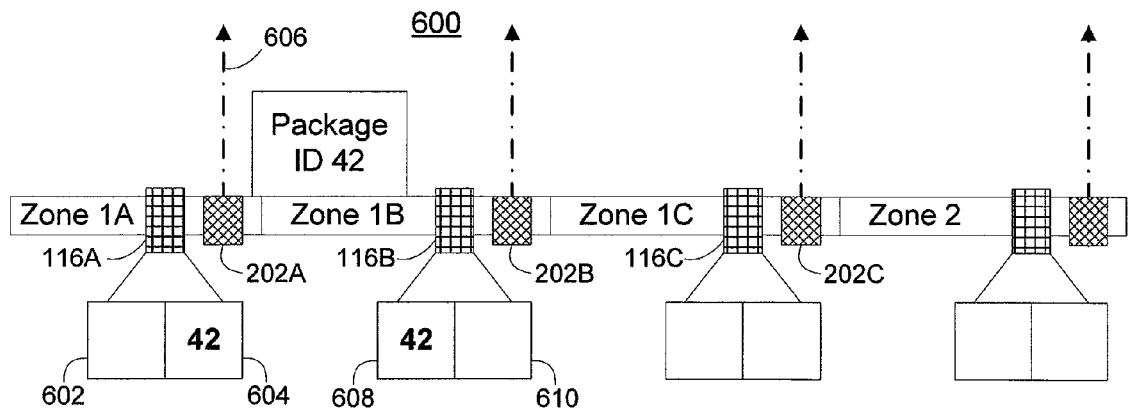

In FIG. 6C, package 42 is no longer being detected by sensor 202A (e.g., package 42 has moved beyond the sensor's field of view 606). In response to sensor 202A no longer detecting package 42 and/or in response to sensor 202A detecting the trailing edge of package 42, zone controller 116B may notified and begin a monitoring the time it takes for package 42 to be detected by sensor 202B. If package 42 does not arrive at sensor 202B within the allotted time period (which may be preconfigured, dynamically determined and/or manually configured), zone controller 116B may determine that an error has occurred. If an error is deemed to have occurred, the appropriate error correction steps may be taken (some examples of which are discussed above). Accordingly, the decentralized tracking module of Zone 1B actively monitors and waits for an input from its sensor (i.e., sensor 202B) or for an error situation to be determined (e.g., such as a time out error) before any data in its registries 608 or 610 is modified. It is sometimes referred to as "stage 2" while the package is traveling between sensors of adjacent zones and a potential error situation is being actively monitored.

Figure 7A:
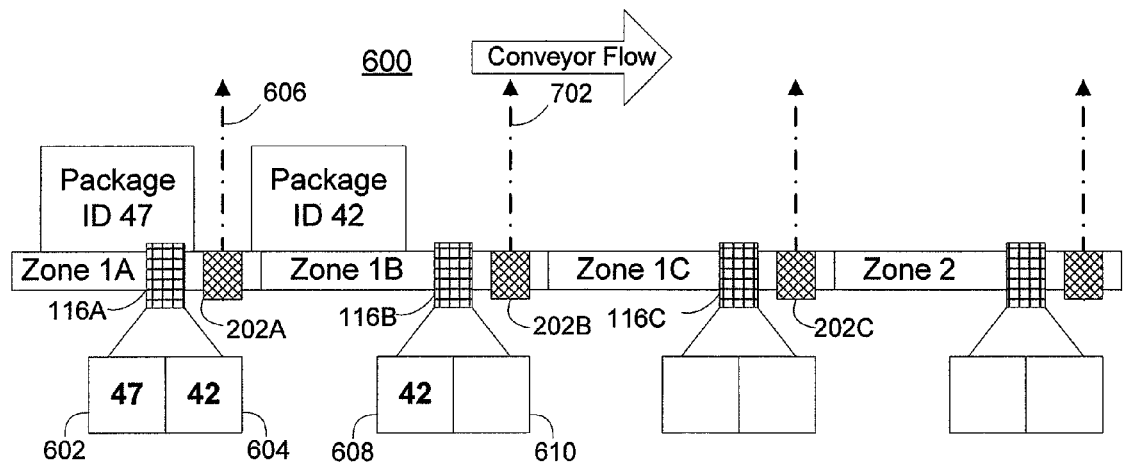

FIG. 7A includes a new package, package 47, that was received by the conveyor system at Zone 1A, while package 42 is transitioning into Zone 1B. Relative to conveyor's flow direction and package 42's position on the conveyor, package 47 can be considered the "trailing" package. Similarly, relative to package 47's position and the conveyor's flow direction, package 42 can be considered the "leading" package. Loading registry 602 is populated with the tracking data corresponding to package 47. As mentioned above, the tracking data can include, for example, a randomly generated number, data generated by an input device (not shown) based on machine-readable information or user-entered information, etc.

As packages 42 and 47 move downstream, it becomes apparent that the two packages were placed or positioned (by the conveyor system or a user) on the conveyor in a manner that causes the two packages to at least partially occupy the same zone at the same time. Although some conveyor systems may not rectify the positioning of the packages automatically, the conveyor system shown in FIGS. 6-10 does.

In some embodiments, two packages are preferably spaced apart at least the distance provided between the two sensors (e.g., sensors 202A and 202B). In such embodiments, when packages are too close together (e.g., closer than two adjacent zones' sensors), an error situation may be present. The error situation may cause the error procedures discussed herein (e.g., those discussed in connection with FIG. 4A) to be implemented, and/or the error situation can be rectified (e.g., the packages' movement can be controlled also, so that the packages' spacing is adjusted to be acceptable).

Figure 7B:
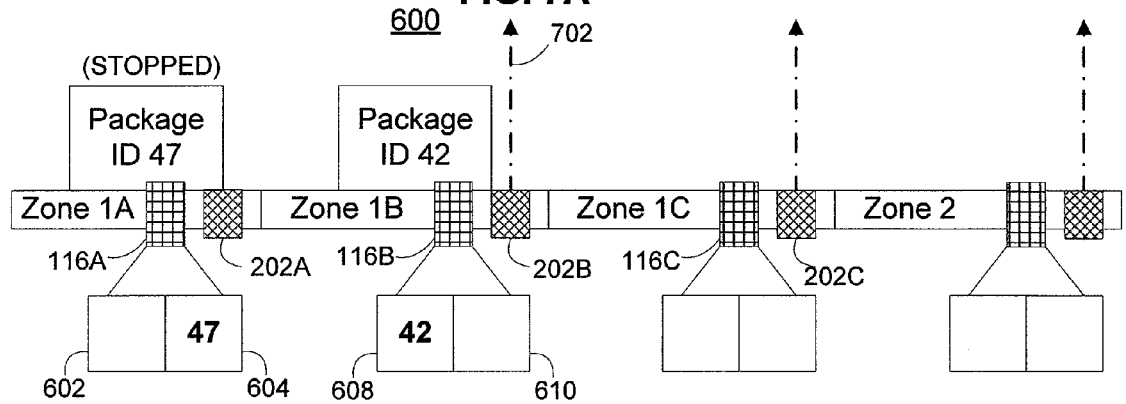

For example, in some embodiments, in response to zone controller 116B receiving position data from upstream sensor 202A before zone controller 116B receives position data from subject sensor 202B, a determination may be made that the packages' spacing is unacceptable. In response, zone controller 116B may communicate with zone controller 116A and, as a result of the communications, corrective actions may be taken. For example, package 47's movement may be slowed and/or stopped temporarily, until package 42 is detected by sensor 202B. FIG. 7B shows corrective actions being taken, i.e., package 47 is stopped while package 42 moves down the line. Subsequent to and/or in response to package 42 being detected by sensor 202B, package 47 may begin moving down the conveyor.

In some embodiments, the decentralized tracking system, for example, can be configured to track both packages in the absence of any corrective measures taken by the conveyor system. In this manner, the conveyor system would not need to slow the flow of any package to facilitate the tracking of a package.

Because package 47 being detected by sensor 202A in FIG. 7B, as discussed above, package data 47 is reassigned from loading registry 602 to zone registry 604. However, in some of the depicted embodiments, because package 42's tracking data is still populating loading registry 608 of Zone 1B, zone controller 116B does not write package 47's tracking data into loading registry 608 (even if zone controller 116B received the position data of package 47 from Zone 1A).

Figure 7C:
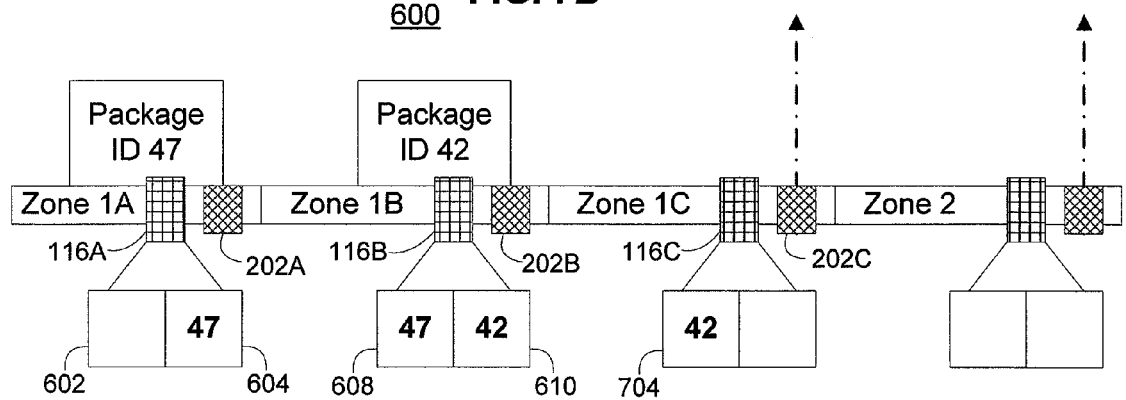

As package 42 moves down the conveyor system, sensor 202B eventually detects package 42 when it moves into field of view 702, which is shown in FIG. 7C. In response to package 42 being detected by sensor 202B, package 42's tracking data is reassigned from loading registry 608 to zone registry 610, and package 47's tracking data populates loading registry 608. It is sometimes referred to as "stage 3" when a subject zone (e.g., Zone 1B) confirms that it has received the package that the subject zone had been expecting. In some embodiments, one skilled in the art would appreciate that one or more tracking elements may each implement one or more registries. For example, one or more tracking elements of decentralized tracking system may implement three registries, one for each of the three stages mentioned above.

The adjacent downstream zone, Zone 1C, is also notified of package 42's position (thereby entering its stage 1 with regards to package 42). Package 42's tracking data is then stored in loading registry 704 of Zone 1C.

Figure 8A:
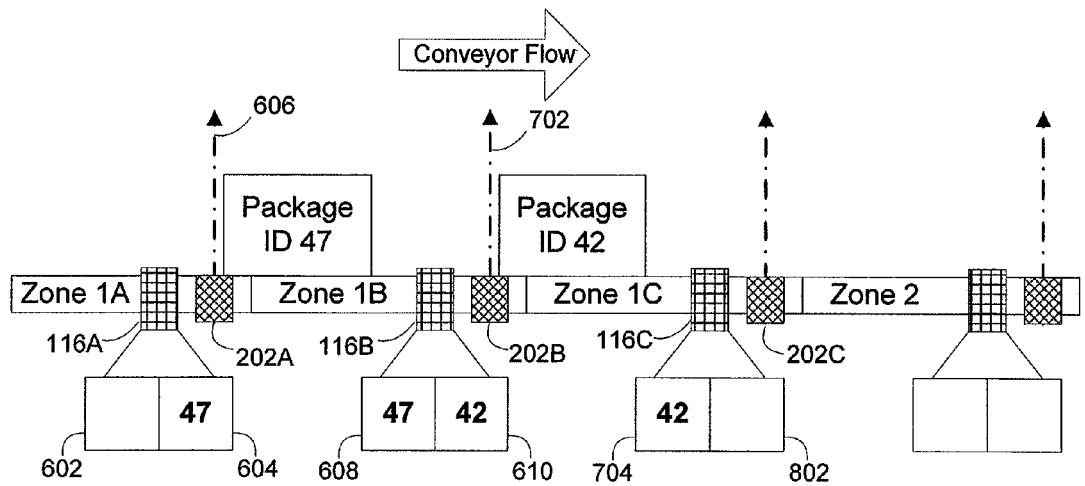

In FIG. 8A, packages 42 and 47 have cleared field of views 702 and 606, respectively, are in stage 2, and the zones' circuitry can be functioning as described above.

Figure 8B:
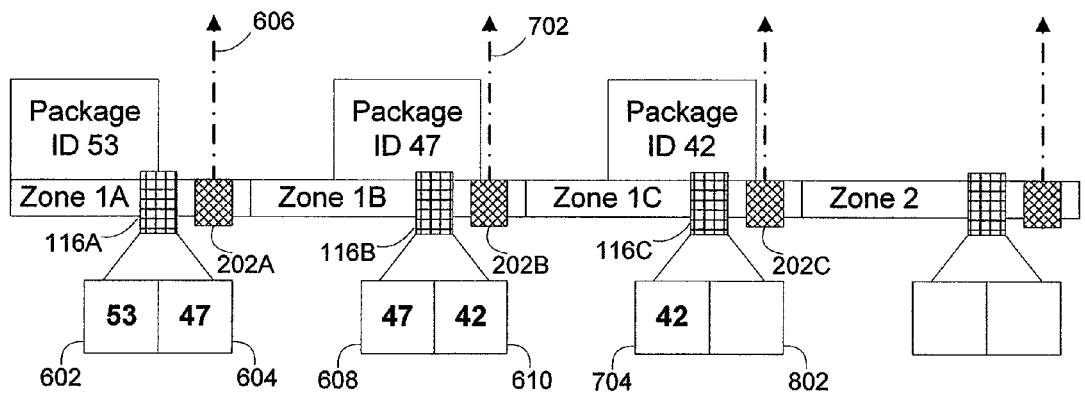

In FIG. 8B, a third package, package 53, has been received by the conveyor system. Similar to the packages before it, package 53's tracking data is generated/received and stored in Zone 1A's loading registry 602.

Figure 8C:
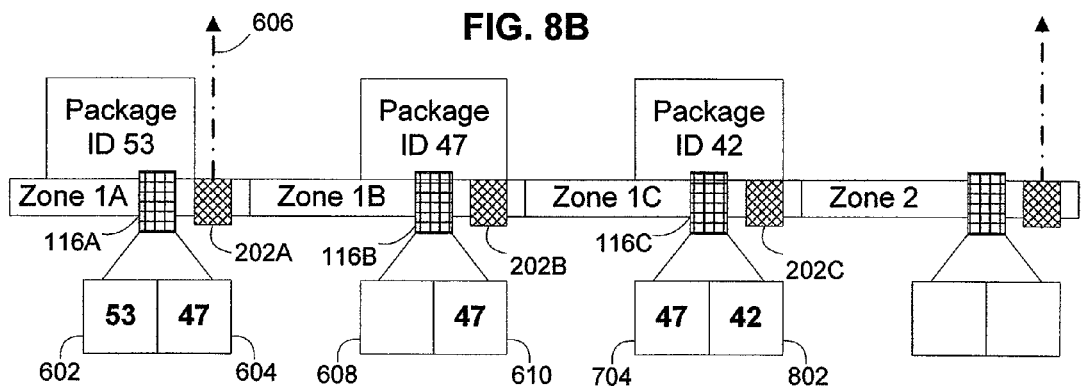

In FIG. 8C, sensor 202A has yet to detect package 53 in field of view 602 and, as a result, package 47's tracking data remains in zone registry 604. FIG. 8C also shows sensors 202B and 202C detecting the leading edges of packages 47 and 42, respectively. The tracking data of packages' 47 and 42 are reassigned, stored and erased as discussed above. In other embodiments (such as those discussed in connection with, e.g., FIGS. 10A and 10B regarding Zone 2), each zone registry (e.g., zone registry 604) may be purged by the zone's circuitry (e.g., zone controller 116A), in response to the zone's sensor (e.g., sensor 202A) detecting the absence of and/or detecting the trailing edge of the package (e.g., package 47) associated with the data stored in the zone registry.

Figure 9A:
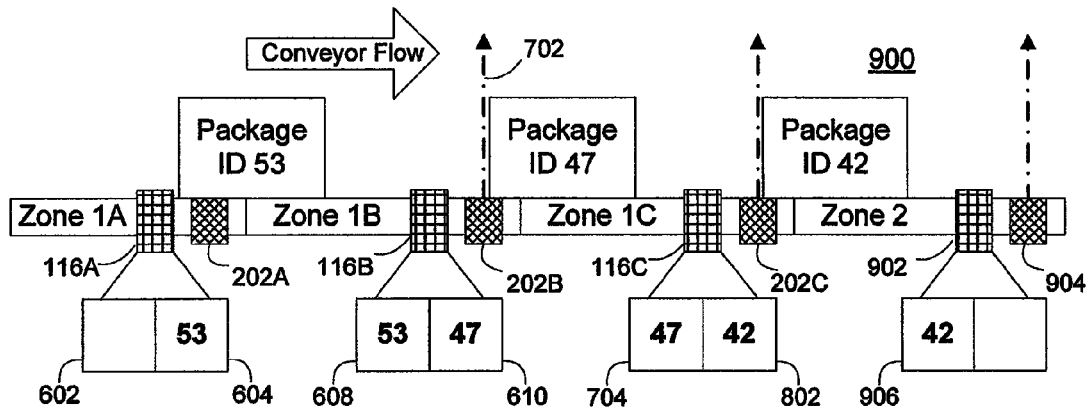

Next is FIG. 9A, in which a situation similar to that presented in FIG. 8A is occurring. However, in FIG. 9A package 53 is now trailing packages 42 and 47, and package 53 is being detected by sensor 202A. Because sensor 202A detected package 53, package 53's tracking data replaced package 47's tracking data in zone registry 604. In addition, package 53's tracking data has populated loading registry 608.

Another difference is that, conveyor segment 100 ends after Zone 1C, and the next segment, segment 900, of the conveyor system begins. Conveyor segment 900 is shown in the drawings as comprising only one zone, Zone 2.

In accordance with embodiments of the invention, Zone 2's tracking module 902 (which can be a stand alone apparatus instead of being integrated into a zone controller like the tracking modules of conveyor segment 100) can store package 42's tracking data in its loading registry 906. Despite being implemented differently (i.e., in an apparatus dedicated only to the tracking element's circuitry, rather than in combination with a zone controller), tracking module 902 can be configured to communicate seamlessly with, for example, zone controller 202C (or any other component implementing a compatible tracking module in an adjacent zone, either upstream or downstream). The apparatus dedicated to decentralized tracking functionality can be useful when retrofitting previous conveyor systems, even when those conveyor systems may also have a central tracking system.

Figure 9B:
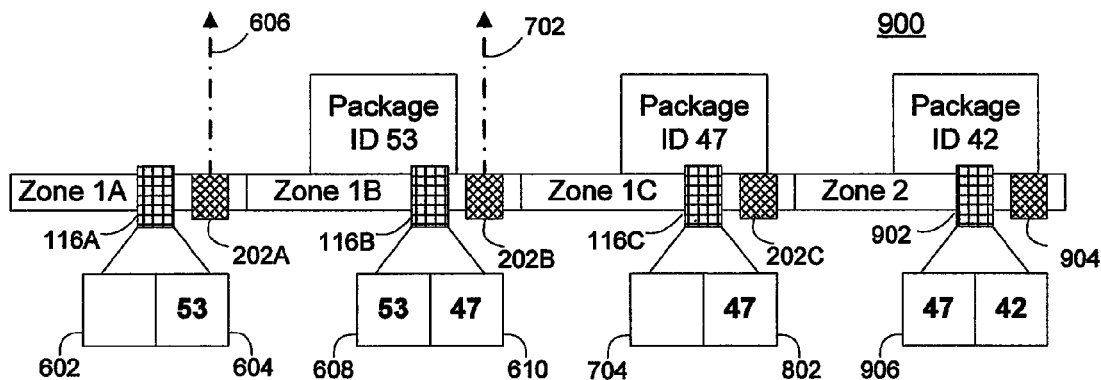
Figure 9C:
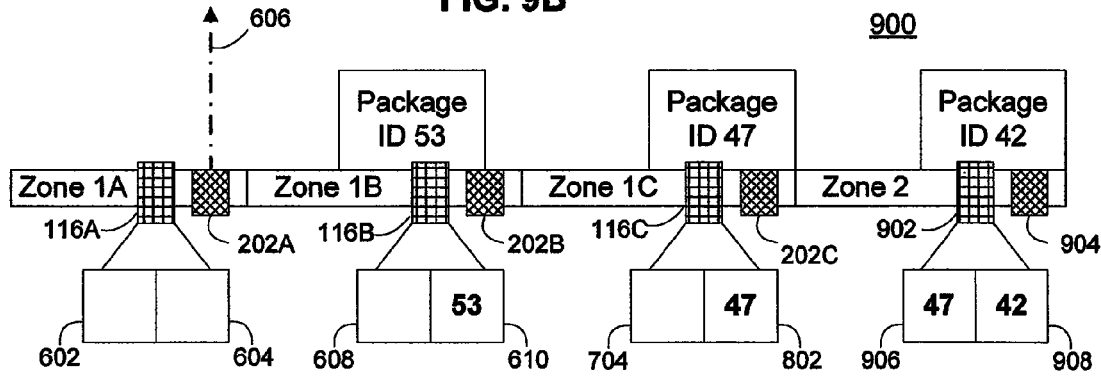

FIGS. 9B and 9C are similar to the drawings discussed above. FIGS. 9B and 9C, however, show a feature that can be implemented in some embodiments of the present invention. In FIG. 9B, package 53 is approaching field of view 702 without having a trailing package. Accordingly, package 53's tracking data is being held in zone registry 604, despite package 53 being well beyond Zone 1A. In some embodiments, package 53's tracking data can remain in zone registry 604 indefinitely. In other embodiments, such as the one shown in FIG. 9C, zone registry 604 can be purged of package 53's tracking data.

In FIG. 9C, package 53 has been detected by an upstream sensor, sensor 202B, and in response a position data signal can be upstream to Zone 1A's tracking circuitry. Zone registry 604 can then be purged if it Zone 1A's tracking circuitry determines that zone registry 604 is still storing package 53's tracking data. As another example, zone registry 604 can be purged after a predetermined period of time has elapsed without another package's data being received into zone registry 604.

Figure 10A:
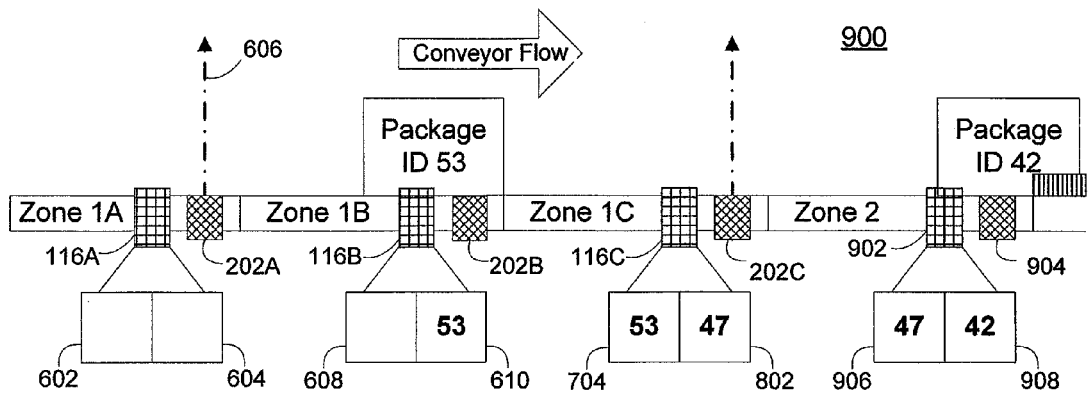
Figure 10B:
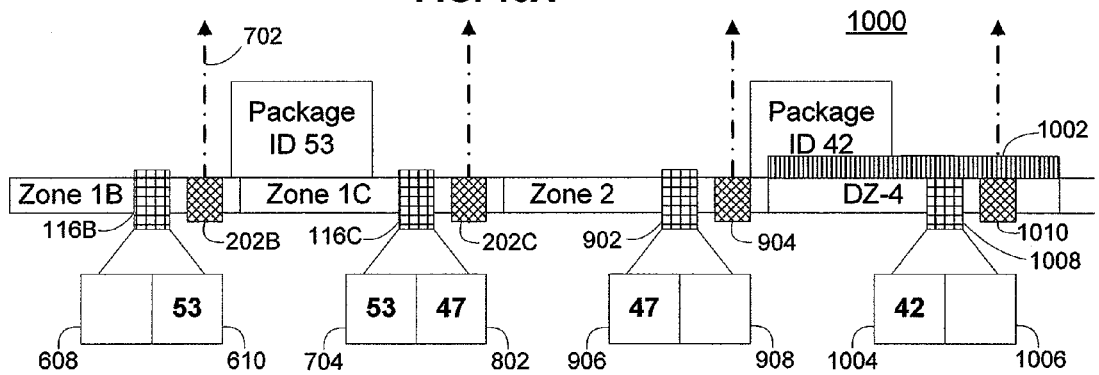

In some embodiments, such as Zone 2 of FIGS. 10A-10B, the zone registry of a subject zone (Zone 2) can be purged in response to the subject zone's sensor (sensor 904) confirming that the package has exited (or is about to exit) the subject zone. For example, in FIG. 10A loading registry 908 of Zone 2 may continue to store the tracking data of package 42 in Zone 2's zone registry 908, until the package clears the field of view of the subject zone's sensor 904. As shown in FIG. 10B, in response to package 42 moving beyond the field of view of sensor 904 (and/or otherwise no longer being detected in Zone 2), package 47's tracking data can be purged from zone registry 908. Package 47's tracking data can, however, remain in the downstream zone's loading registry 1004, despite being erased from the subject zone's registry 904.

This illustrated functionality of Zone 2, relative to the functionality of, e.g., Zones 1A-1C, helps show the independence and mutual exclusivity of the operation of each decentralized tracking module, despite the tracking modules being highly sophisticated and dynamically coordinated. One skilled in the art would appreciate that a decentralized tracking system in accordance with embodiments of the invention may be comprised of one or more (adjacent) zones that function similar to (or the same as) Zone 2, Zone 1A, anything else discussed herein, and/or any combination of features of each.

In addition, FIG. 10A introduces an example of a potential error situation. In particular, package 47 has been removed unexpectedly from the conveyor system, i.e., Zone 1C, after to package 47 reaching field of view 904 of sensor 202C.

Figure 10C:
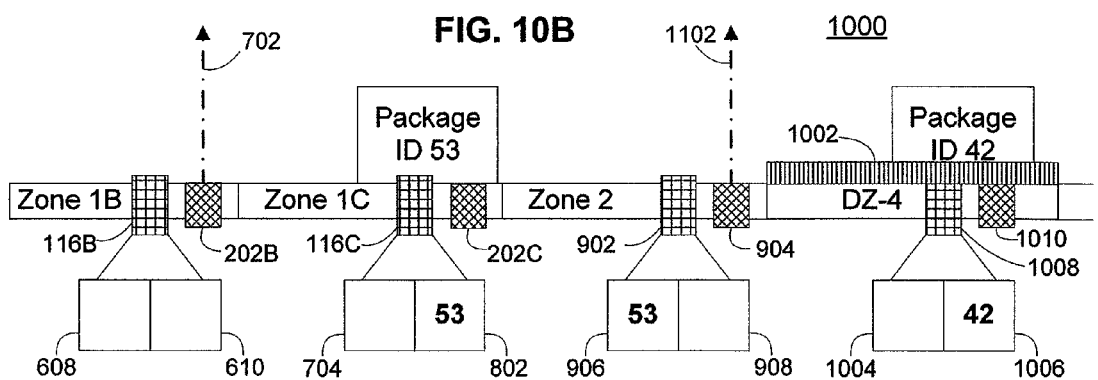

FIGS. 10B and 10C show how the tracking system may respond to an error situation that developed while other packages continue to flow down the conveyor line. For example, subsequent to package 53 being detected by sensor 202B, loading registry 704 of Zone 1C is updated to include package 53's tracking data. Although package 47 is no longer on the conveyor (or at least not in one piece where it was previously), zone controller 116C continues to store package 47's tracking data in zone registry 802 of Zone 1C. The tracking data will be stored in zone registry 802 until, for example, a predetermined period of time elapses, or until any other criteria is met (some additional examples of which are discussed above in connection with, e.g., FIG. 4A). In other embodiments, the tracking data will be purged from zone registry 802 the moment the zone's sensor 202C detects the absence of package 47 (similar to or the same as the discussion above in connection with, e.g., Zone 2).

FIG. 10C shows an example of how the decentralized tracking system can respond to such an error. In particular, FIG. 1C shows package 47's tracking data has been erased from zone registry 802 and (subsequently) replaced with package 53's tracking data (which was reassigned from loading registry 704). In some embodiments, before the tracking data is purged (due to error situation being detected or for any other reason), the tracking data of a package can be reported to and/or stored in a zone-specific back-up memory component and/or one or more central components (e.g., a central database) that are dedicated to packages that have experienced errors, are missing, no longer being tracked, etc.

FIGS. 10B and 10C also introduce decision segment 1000. Decision segment 1000 is a different type of segment that includes circuitry configured to make a determination based on a package's tracking data and/or any other data associated with the package. Decision segment 1000 can also be configured to perform a function in response to any determination it makes. For example, decision segment 1000 can be diversion zone that redirects and/or sorts packages based on the tracking data or other data associated with the package. As another example, decision segment 1000 can add data (e.g., in the form of user-readable information or machine readable data, such as a bar code or RFID tag) onto the surface of a package based on the tracking data or other data associated with the package. As yet another example, decision segment 1000 can be used to load materials into a package (such as pharmaceuticals or candy into packaging containers). Decision segment 1000 can also determine the mass, volume, chemical composition, weight, nutritional value and/or any other characteristics of the package (and/or its contents) as the package moves through DZ-4. For example, decision segment 1000 can be any type of device and/or component that is configured to make a determination as to whether or not the tracking data, package contents, package and/or anything else associated with the package should be modified and, if so, modify the data, package, package contents, etc. accordingly using any means available.

Decision segment 1000 is shown in drawings as including Zone DZ-4. Zone DZ-4 can include, for example, one or more components, such as component 1002, which can include additional circuitry and/or perform any additional functionality that Zone DZ-4 is configured to execute. Among other things, component 1002 can implement the diversion steps discussed above in connection with, e.g., FIG. 5.

Component 1002 can be configured to access the data stored in loading registry 1004 and/or zone registry 1006. In some embodiments, component 1002's circuitry (e.g., redirection circuitry, printing circuitry, etc.) can be configured to access loading registry 1004 and/or zone registry 1006 directly. In other embodiments, the circuitry of component 1002 can request data from loading registry 1004 and/or zone registry 1006 from the circuitry of tracking module 1008. Loading registry 1004, zone registry 1006, and tracking module 1008 can function the same as or substantially similar to the like components discussed above.

Component 1002 can also be configured to communicate with sensor 1010. Sensor 1010 can function the same as or substantially similar to sensors 202A, 202B, and/or 202C discussed above. Sensor 1010 can also be used to trigger the activation of component 1002.

Figure 11A:
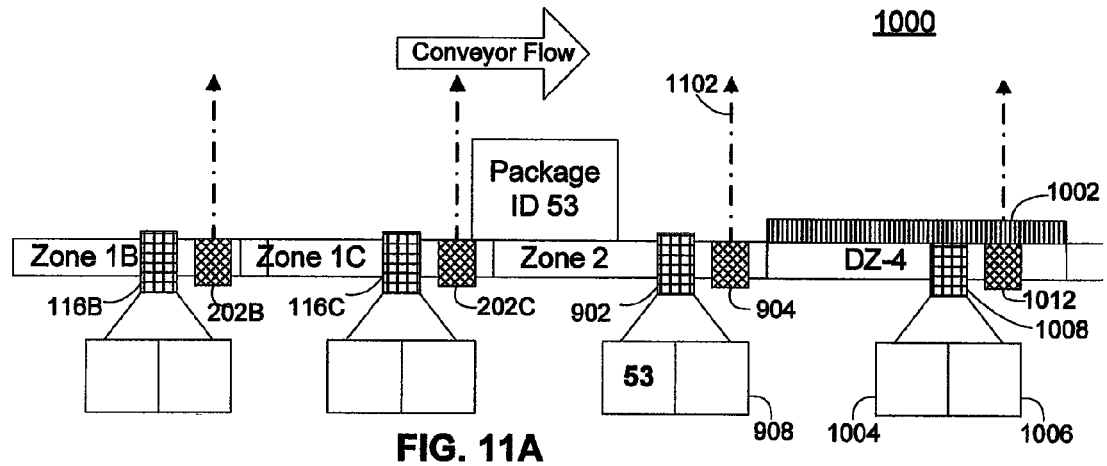
Figure 11B:
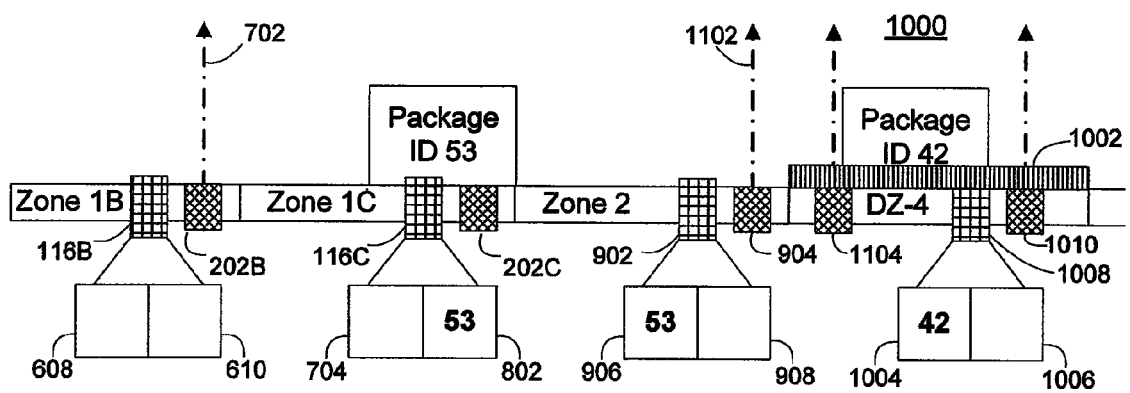

In some embodiments, component 1002 can include a mechanical transducer (pusher arm unit, air blowing unit, track switching unit, etc.) that can be used to divert a package by redirecting a package's movement direction based on the package's tracking data. For example, the zone identifier's name, i.e., DZ-4, could cause any package that has "4" in its tracking data to be diverted. In such embodiments, in response to package 42's tracking data being stored in loading registry 1004, Zone DZ-4 can determine that package 42 should be diverted by Zone DZ-4. In response to package 42 being detected by sensor 1010 and/or package 42's tracking data being reassigned to zone registry 1006, component 1002 can receive a command signal that causes it to activate and divert package 42. In FIG. 11A, package 42 has been diverted by Zone DZ-4.

In some embodiments, in addition to or instead of sensor 1010 controlling the timing of component 1002's activation, an encoder, for example, can be used to determine when to actuate any functionality performed by component 1002. As another example, velocity data, position data from sensor 904, any combination thereof, and/or any other data can be used to actuate component 1002.

However, package 42 has moved beyond field of view 1102 of sensor 904. Sensor 904 and/or tracking module 902 has sent position data to tracking module 1008 and, in response, tracking module 1008 has reassigned package 42's tracking data from loading registry 1004 to zone registry 1006. In some embodiments, the tracking data being reassigned to zone registry 1006 can trigger the functionality of component 1002. In other embodiments, the functionality of component 1002 is delayed until, for example, sensor 1012 provides a signal that indicates the package has moved beyond sensor 1010's field of view.

In alternative embodiments, one or more additional sensors can be implemented in a zone. For example, in FIGS. 11B and 11C, an additional sensor 1104 has been placed at the other end of a zone (e.g., the downstream portion). One advantage of having sensor 1104 in the upstream portion of decision zone 1000 is that sensor 1104 can produce an output signal that causes component 1002 to perform an action. Sensor 1104's output signal can be sent directly to component 1002 and/or processed by other circuitry (such as, e.g., tracking module 1008's circuitry) before being received at component 1002. For example, sensor 1104 can be used to determine when package 42 is located next to a push arm, so the push arm is actuated at the appropriate time.

For example, sensor 1104 can be used to detect when package 42 has moved beyond its field of view and, in response, component 1002 can receive a command that causes it to, for example, redirect package 42. As discussed above, when a package is redirected, tracking module 1008 can be configured to receive a destination data signal from component 1002's circuitry and, in response, direct the tracking data associated with package 42 accordingly (to, e.g., an external device, such as a netbook computer, one or more other tracking elements, etc.). For example, component 1002 can inform tracking module 1008 (by way of the destination data signal) that package 42 has been redirected to a particular, new path (e.g., conveyor path 2) and, in response, tracking module 1008 can send the tracking data to an external device, which forwards the data onto another external device (such as a second personal computer), which then provided package 42's tracking data to a tracking element dedicated to the first zone (or, more generally, conveyor area) of the package's new path.

Figure 11C:
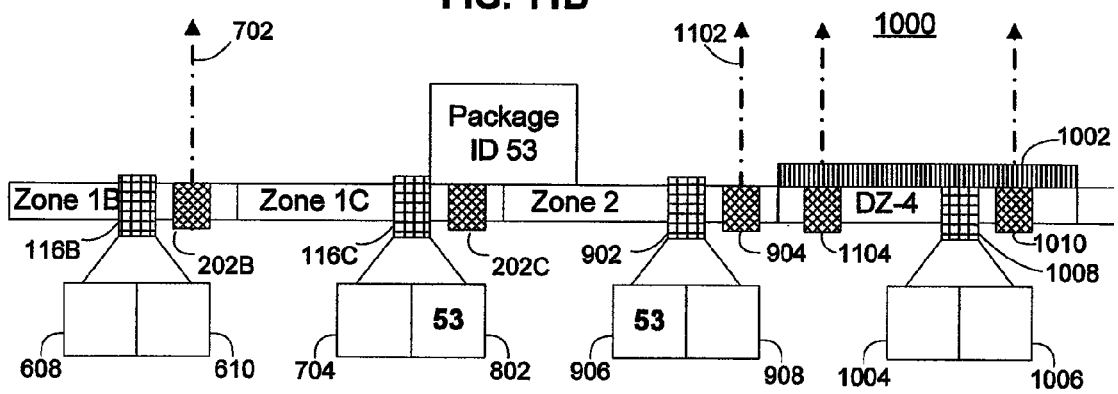

After the package has be redirected, tracking module 1008 can receive a confirmation signal that the tracking data of package 42 has been properly uploaded (and, e.g., without error) to the tracking element associated with package 42's new path. In response to the confirmation signal, tracking element 1008 can delete package 42's tracking data from zone registry 1006 as shown in FIG. 11C. Alternatively, package 42's tracking data can remain in zone registry 1006 for a predetermined period of time, until new data needs to be stored in zone registry 1006, until an error situation is determined, forever, until a user manually clears the registry, and/ or until any other time or stimuli.

In some embodiments, sensor 1010 can be used, for example, to determine the position of packages and confirm that packages not meant to be directed were actually not redirected. A package may not be redirected purposefully (e.g., the package is not supposed to be redirected at decision zone 1000) or after an error occurs.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Figure 12A:
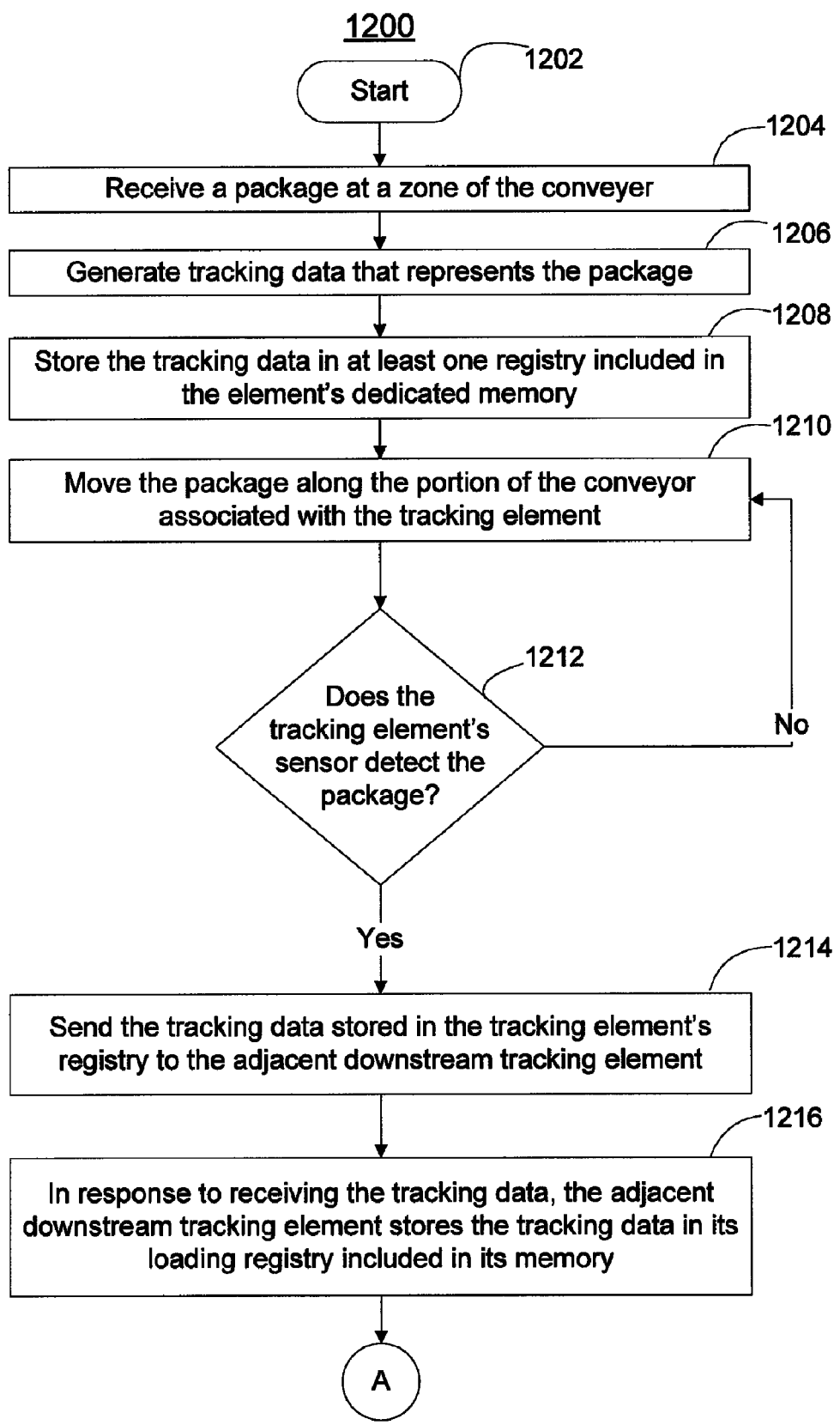
Figure 12B:
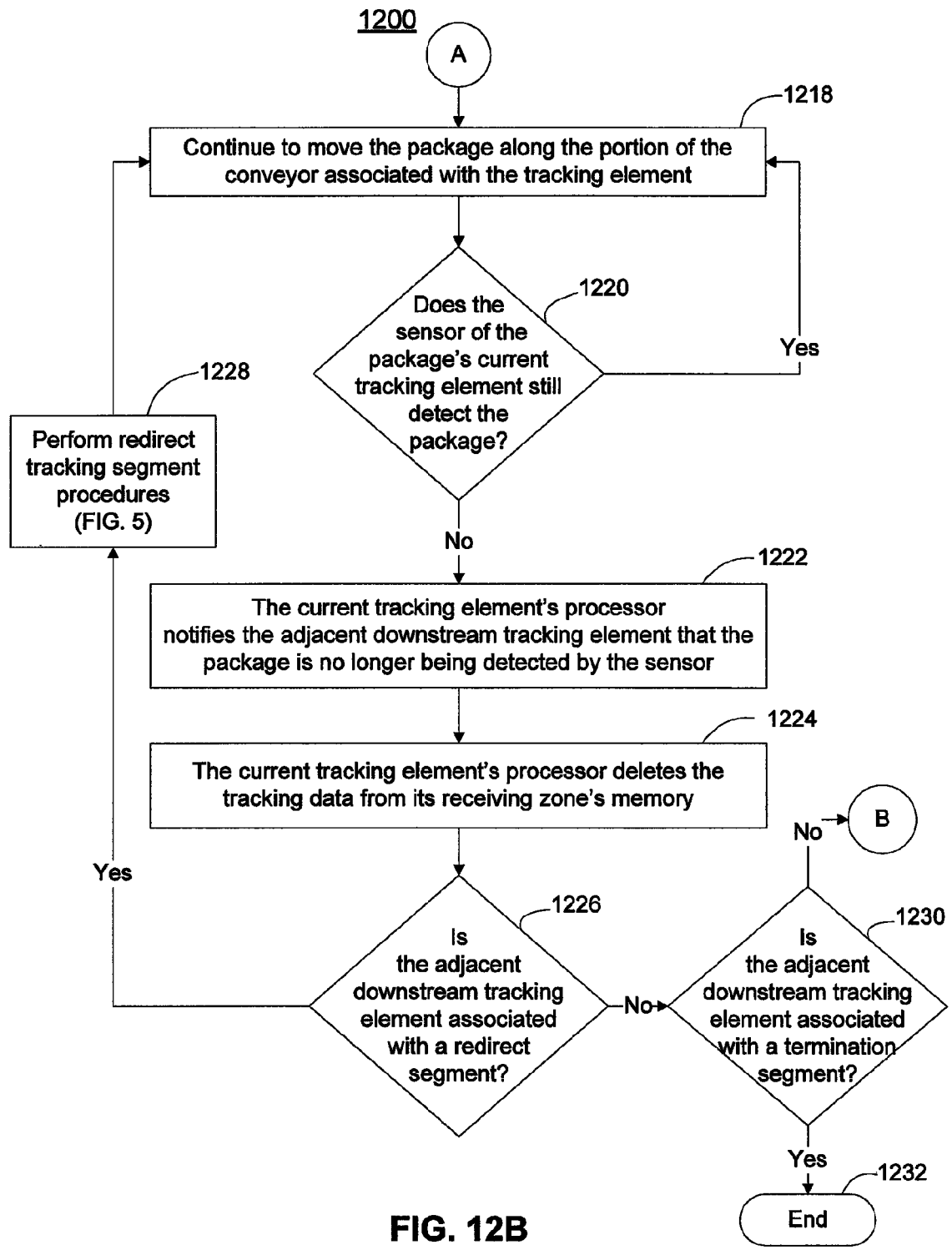
Figure 12C:
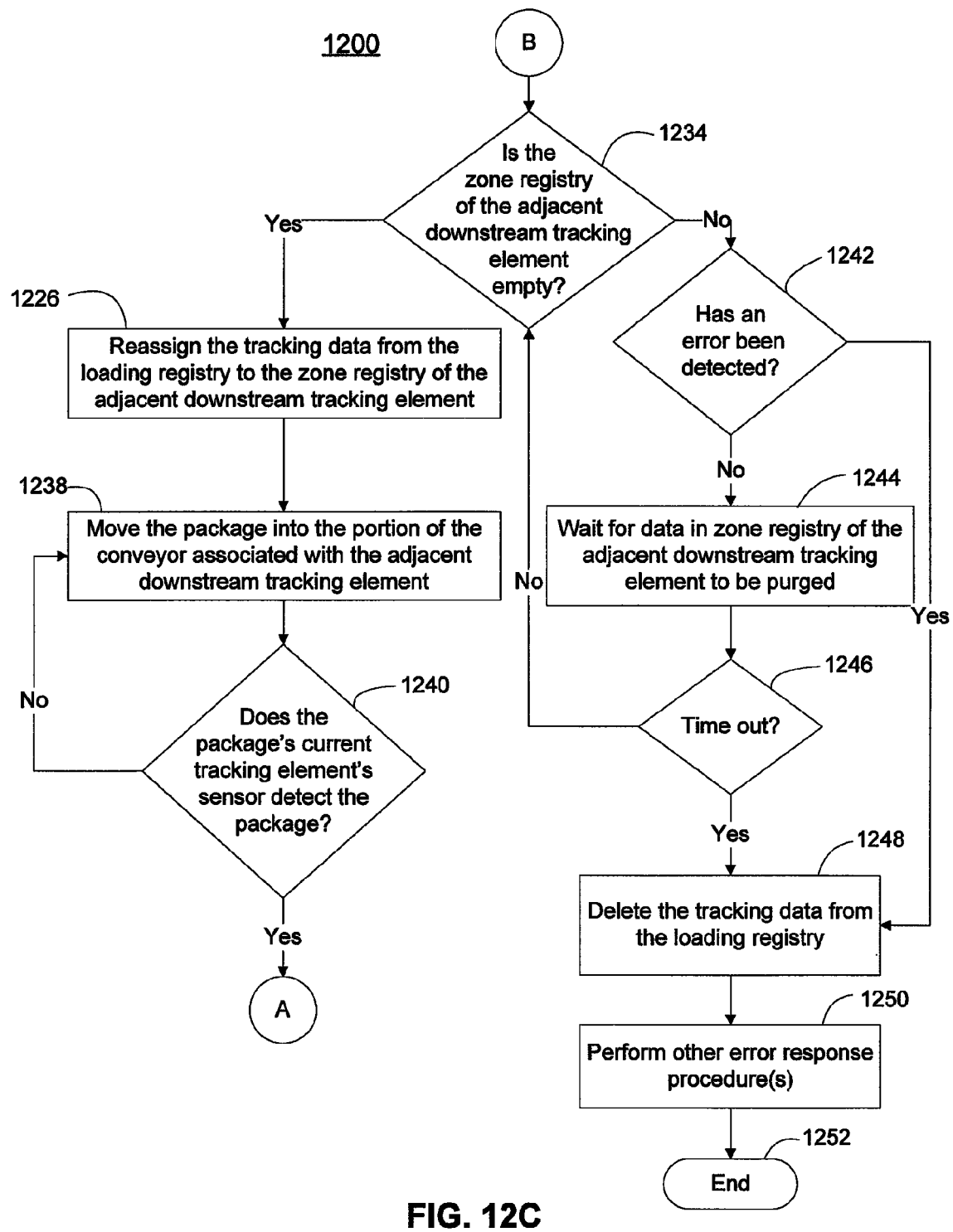

For example, FIGS. 12A-12C show an exemplary process for tracking a package that may be performed by decentralized tracking systems structured in accordance with some other embodiments of the invention. The depicted tracking system is decentralized in that the tracking elements of the tracking system do not use a central component. Data is passed from the circuitry in a first tracking element to the circuitry in the adjacent downstream tracking element. In some embodiments, a centralized control component can be used to compliment, enhance, and/or provide some advanced functionality to the decentralized tracking system. For example, one or more central components (e.g., central processing center, server, and storage component) can be used to serve and store sorting data and more detailed package information (more detailed than what the decentralized tracking system uses to track a package).

Process 1200 starts at step 1202 and proceeds to step 1204. At step 1204, the package is physically received at a zone of the conveyor system. The zone that receives the package can be a zone specifically designated as an infeed zone that has one or more additional input devices, such as a barcode scanner or RFID reader. Similarly, the zone that receives the package could be any zone (including a mid-conveyor transfer zone) in the conveyor.

Next is step 1206 at which tracking data is generated. The tracking data represents the package received at step 1204. Tracking data can include, for example, a package identifier and/or more detailed package information. The tracking data can be generated by a random number generator included in, for example, the tracking module (in response to, e.g., a sensor detecting a new, unidentified and/or unexpected package), by an input device that is coupled to the tracking module, or by any other means.

The tracking data is stored in memory at step 1208. The memory can be dedicated to the tracking element (e.g., store data only pertaining to that one tracking element) and include at least one registry (referred to herein as the "zone registry") dedicated to storing the package information of the particular package currently located within that tracking element of the conveyor system. Each registry discussed herein can be any size, ranging from relatively small (e.g., 1-16 bytes) to relatively large (e.g., 40 or 80 GB or larger). The tracking element's processor can also be programmed to allocate the size of each registry dynamically based on the amount of storage space remaining, amount of package-specific data being received, the importance of the particular package or package data, etc.

At step 1210 the package is physically moved along the tracking element's conveyor, which may include spinning rollers, etc. The package's tracking is dependent on the package's movement and, in some embodiments, vice-versa. Accordingly, the package can be moving while any step of process 1200 (or any other process discussed herein) is occurring. Each decentralized tracking module can be configured to actively monitor for packages and sample the location(s) of its corresponding tracking element frequently enough to avoid loosing a package because the package is moving to quickly along the conveyor.

At step 1212, the processor of the decentralized tracking module determines whether or not a sensor detects the package. In the embodiments that use a sensor at step 1206 to also trigger the generation of tracking data (by a random number generator or in response to an error), the sensor being queried at step 1212 can be the same sensor or a different sensor. The sensor that is queried at step 1212 can be, for example, positioned closer to the downstream end of the tracking element (e.g., within the downstream third or quarter, or within 1-12 inches of the end of the tracking element), whereas the sensor that initiates the generation of the tracking data can be at the upstream end of the tracking element (e.g., within the upstream third or quarter, or within a few inches of the beginning of the tracking element). The positioning of the sensor(s) can also be dependent on the size of packages and size of tracking elements and/or zones, and may be consistent or varied throughout the conveyor system.

In response to determining that the package is indexed by the sensor (e.g., a visual sensor is unobstructed), process 1200 returns to step 1210 and lets the package move along the tracking element's conveyor. Once the tracking element's sensor does detect the package, process 1200 proceeds to step 1214.

At step 1214 the processor uploads the tracking data from one or more of the registries of the tracking element's dedicated memory, and sends the tracking data to the adjacent downstream tracking element's tracking module. Each tracking element's communications circuitry can help facilitate the sending and receiving of data, including any handshaking, authorization and/or authentication that may need to take place before data is exchanged.

Next is step 1216. In response to receiving the tracking data, the adjacent downstream tracking element stores the tracking data in its dedicated memory. In some embodiments and as discussed above, the memory of each tracking module can include a loading registry and a zone registry. The loading registry can be dedicated to storing the tracking data associated with the package currently physically located in an upstream adjacent zone. The zone registry can be used to store the tracking data of the package currently located within the tracking element associated with the zone registry.

Process 1200 continues in FIG. 12B at step 1218. The package continues to move along the tracking element's conveyor at step 1218 while the processor determines whether the sensor is still detecting the package at step 1220. In response to the package being detected at step 1220, process 1200 returns the step 1218 and the zone controller of the tracking element continues to move the package along (unless an override command, stop command, pause command, etc. is received).

In response to the sensor indicating at step 1220 that the package has moved down the conveyor line, the processor of the tracking module associated with the sensor notifies the adjacent downstream tracking element, at step 1222, that the package is no longer being detected (e.g., that the sensor detected the trailing edge of the package, is not detecting anything in its field of view, etc.). Step 1222 is an example of step that can be omitted in other embodiments. For example, step 1222 could be omitted from process 1200 if each sensor was hardwired or otherwise able to directly communicate with the processor in its tracking element as well as the processor in the adjacent downstream tracking element.

Also in response to the package no longer being sensed at step 1220, the sending tracking element's processor deletes, at step 1224, the tracking data from the sending tracking element's memory. Prior to step 1224 being executed, the sending tracking element's processor may also require a confirmation from the receiving tracking element's processor (in the adjacent downstream tracking element) that the tracking data was successfully reassigned. In response to determining that the tracking data was reassigned unsuccessfully initially, the sending tracking element's processor can be configured to resend the tracking data, until the receiving tracking element confirms that the tracking data was correctly received.

Next is step 1226, at which a determination is made as to whether the adjacent downstream tracking element (i.e., the receiving tracking element from step 1224) is a redirect tracking element. A redirect tracking element is a specialized portion of a conveyor system that can be implemented to automatically redirect a package. Redirect tracking elements are especially useful for sorting and distributing packages to various locations. If the adjacent downstream tracking element is a redirect tracking element, process 1200 proceeds to step 1228 and the appropriate redirect procedures can be executed. In some embodiments of the invention, the decentralized tracking system can be used to redirect the package. An example of such a procedure is discussed further in connection with, e.g., FIGS. 5 and 11. After step 1228, process 1200 returns to step 1218.

In response to determining at step 1226 that the adjacent downstream tracking element is not a redirect tracking element, process 1200 proceeds to step 1230. If, at step 1230 a determination is made that the adjacent downstream zone is a termination tracking element, i.e., a tracking element that concludes a portion of the conveyor system, process 1200 ends at step 1232.

In response to determining the adjacent downstream tracking element is not a termination tracking element (but, e.g., another transfer tracking element), process 1200 continues to step 1234 of FIG. 12B. At step 1234 the processor of the adjacent downstream tracking element determines whether its zone registry is empty. Its zone registry will have a value (e.g., tracking data) if, for example, another package is currently in the adjacent downstream zone or if an error occurred.

In response to determining that the zone registry is empty (or otherwise capable of receiving the tracking data), the processor of the adjacent downstream tracking element reassigns the tracking data from the loading registry to the zone registry at step 1236. The reassign procedure can include deleting the tracking data from the loading registry and can be executed by, for example, merely reassigning one or more data pointers.

Next is step 1238, during which the package moves into the adjacent downstream tracking element along its conveyor. The processor of the adjacent downstream tracking element then continues to monitor the signal (or lack thereof) being generated by its sensor (or sensor array). Once the package is directed by its sensor, process 1200 returns to step 1218 of FIG. 12B, and the adjacent downstream tracking element is now the package's current tracking element.

Returning to step 1234, in response to determining that the zone registry of the adjacent downstream tracking element is occupied or otherwise still unable to receive the tracking data (because another package's tracking data is currently occupying the zone registry), process 1200 proceeds to step 1242 and determines if an error has occurred and/or been detected.

In response to determining that no error has been detected (or occurred) at step 1242, process 1200 proceeds to step 1244 at which the processor of the adjacent downstream tracking element waits to receive a signal (such as a sensor signal and/or other position data) that causes the processor to purge the zone registry. At step 1246, a determination is made as to whether or not the processor has been waiting too long to purge the zone registry. The amount of time a processor should wait (timeout period) can be preconfigured by a user or dynamically determined based on, e.g., the velocity of the conveyor, the size of the packages, the number of roller rotations, etc. If the processor determines it should continue to wait, process 1200 returns to step 1234.

In response to determining at step 1246 that the timeout period has expired, process 1200 proceeds to step 1248. Step 1248 also follows step 1242 after a determination has been made that an error has been detected. Some examples of events that can be interpreted by the tracking system as errors are a package spilling its contents on the conveyor, a package being removed from the conveyor, an unidentified package being detected, etc. The tracking data is deleted from the loading registry at step 1248 (if there was any present).

Next is step 1250, at which other error response procedure(s) can be preformed. For example, an alarm may sound, new tracking data may be generated and sent upstream (or to a central component), a record may be created and stored in the tracking module's memory or at a central database, a wireless phone call could be made, the conveyor line may be stopped, etc. Process 1200 then ends at step 1252.

Another example of something one skilled in the art would appreciate is within the spirit of the invention, is when a package is no longer being detected by a subject zone's sensor (e.g., the package has moved into the downstream zone) or in response to the subject zone's sensor detecting the trailing edge of the package, the package's tracking data in subject zone registry can be cleared (even before it times out, an error situation develops, or the leading edge of another package is detected by the subject zone's sensor). The processor of the subject zone, for example, can issue the delete command for the subject zone registry.

As another example of a modification that could be made without departing from the spirit of the present invention, rather than have the sensor of each tracking element positioned in the downstream portion of the zone (and/or segment or, more broadly, the area of the conveyor system) that is being monitored by the tracking element, the sensor can be positioned in the upstream portion of the area. In such embodiments, rather than (or in addition to) having the upstream zone's sensor inform a subject zone's circuitry that the subject zone is receiving (or has received) a package, the subject zone's sensor can inform the subject zone's circuitry that the subject zone is receiving the package. In these embodiments, the subject zone's loading registry may be populated when the subject zone's sensor senses a package and the subject zone's zone registry can populated when the subject zone's sensor no longer senses the package. The subject zone's zone registry can then be purged in response to, for example, the downstream zone's sensor detecting the package.

As another example, each tracking element can include two sensors, one in the upstream portion of the area assigned to the tracking element and one in the downstream portion. While these embodiments may increase the amount of equipment needed for each tracking element, they may eliminate the need to exchange position data among the tracking elements. Only tracking data may be exchanged between tracking elements. For example, in response to the subject zone's upstream sensor detecting the package, the subject zone's loading registry can be populated with tracking data received from the adjacent upstream zone. In response to the package moving beyond the field of view of the subject zone's upstream sensor, the subject zone's loading registry can be deleted and the tracking data can be written to the subject zone's zone registry. In response to the subject zone's downstream sensor detecting the package (or detecting the trailing edge of the package), the package's tracking data can be provided to the downstream zone's tracking element and purged from the subject zone's zone registry.

Although specific terms are employed herein, they are used in a generic and descriptive sense only and not for purposes of limitation. Moreover, steps of the methods and components of the systems can be replaced, rearranged, omitted, divided, appended, modified and/or combined without departing from the spirit of the present invention.

For example, although the tracking modules are often discussed herein as being embodied in each zone controller, each of the tracking modules and compounds could be isolated, produced, and sold as a single, stand alone conveyor segment. Also, it should be noted that the modules could also be embodied in software, hardware, firmware, or combinations thereof and still perform the functions discussed herein. Accordingly, the tracking hardware of the embodiments discussed herein (and other embodiments wherein the control logic and tracking system modules for each zone is contained within the zone and easily connectable to upstream and downstream zones) are scalable to allow easy adding of zones, or combining zones, to increase the length and/or efficiency of the conveyor system.

That which is claimed:

1. A method of tracking packages on a multi-zone conveyor having a subject zone and a downstream zone, the method comprising:
   receiving, with subject zone circuitry that is dedicated to the subject zone, first package tracking data, wherein the first package tracking data represents a first package;
   in response to receiving the first package tracking data, storing the first package tracking data in a subject zone loading registry;
   detecting the presence of the first package in the subject zone;
   in response to detecting the first package in the subject zone,
      reassigning the first package tracking data from the subject zone loading registry to a subject zone registry;
   receiving, with the subject zone circuitry, second package tracking data, wherein the second package tracking data represents a second package; and
   storing the second package tracking data in the subject zone loading registry.

2. The method of claim 1 further comprising receiving the first package in the downstream zone.

3. The method of claim 2 further comprising:
   in response to detecting the first package in the subject zone, sending a notification to the downstream zone of the first package; and
   receiving, with downstream zone circuitry dedicated to the downstream zone, the notification of the first package.

4. The method of claim 3 further comprising:
   sending the first package tracking data from the subject zone to the downstream zone, wherein the downstream zone circuitry receives the first package tracking data directly from the subject zone circuitry; and
   storing the first package tracking data in a downstream zone loading registry that is dedicated to storing data about a package that is at least partially physically located in the subject zone.

5. The method of claim 1 further comprising:
   detecting the presence of the second package in the subject zone; and
   in response to detecting the second package in the subject zone:
      deleting the first package tracking data from the subject zone registry; and
      reassigning the second package tracking data from the subject zone loading registry to the subject zone registry.

6. The method of claim 5 comprising, prior to deleting the first package tracking data and prior to reassigning the second package tracking data, determining that the detecting of the second package occurred within a predetermined period of time from when the storing the second package tracking data in the subject zone loading registry occurred.

7. The method of claim 6 further comprising:
   determining that an error occurred prior to the first package being detected in the downstream zone; and
   in response to determining that the error occurred, deleting the first package tracking data from the downstream zone loading registry.

8. The method of claim 7 further comprising:
   in response to determining that the error occurred, replacing the first package tracking data with error tracking data.

9. The method of claim 1 further comprising:
   outputting the first package tracking data to a display device; and
   displaying first package information that corresponds with the first package tracking data.

10. The method of claim 1, wherein detecting the presence of the first package comprises detecting a leading edge of the first package in the subject zone.

11. The method of claim 1, wherein receiving the first package tracking data comprises receiving data from one or more input components.

12. The method of claim 1 further comprising:
   in response to receiving the first package tracking data, generating a redirecting command; and
   sending the redirecting command to a mechanical transducer.

13. The method of claim 1, wherein receiving the first package tracking data comprises receiving a unique package identifier associated with the first package.

14. The method of claim 13, further comprising:
   parsing the unique package identifier;
   determining that a portion of the unique package identifier matches a diversion zone identifier; and in response to determining that the portion of the unique package identifier matches the diversion zone identifier, generating an output that causes a diversion zone associated with the diversion zone identifier to be activated.

15. A package tracking element for a conveyor system, comprising:
 a sensor configured to sense a package;
 a data storage component, wherein the data storage component includes a loading registry and a zone registry;
 communications circuitry configured to receive tracking data that represents a package; and
 decentralized tracking circuitry that is configured to:
  receive the tracking data;
  store the tracking data in the loading registry;
  receive position data from the sensor that indicates the package is being detected by the sensor; and
  in response to receiving the position data, reassign the tracking data from the loading registry to the zone registry.

16. The tracking element of claim 15, wherein the sensor is a photo eye that generates the position data in response to detecting the package.

17. The tracking element of claim 15 further comprising a data port that receives upstream tracking data from an upstream tracking element, wherein the upstream tracking data is associated with an upstream package.

18. The tracking element of claim 17, wherein the upstream tracking data is received subsequent to an upstream sensor detecting the upstream package.

19. The tracking element of claim 18, wherein the upstream position data is stored in the loading registry subsequent to the upstream position data being received by the tracking element.

20. The tracking element of claim 18, wherein the upstream tracking data is sent to the tracking element by upstream communications circuitry of the upstream tracking element.

21. The tracking element of claim 15, in response to the sensor sensing the package, determining that package is nearing a downstream portion of a conveyor area being monitored by the tracking element.

22. The tracking element of claim 21, in response to determining the package is nearing the downstream portion of the conveyor area, the tracking element sends a notification signal to a downstream tracking element.

23. The tracking element of claim 22, wherein the notification signal comprises the tracking data to the downstream tracking element.

24. A redirection apparatus for a conveyor system, comprising:
 a sensor that detects a package;
 a data storage component, wherein the storage component includes a loading registry and a zone registry;
 communications circuitry configured to facilitate downloading of tracking data that represents the package;
 decentralized tracking circuitry that is configured to:
  receive the tracking data;
  store the tracking data in the loading registry;
  receive position data from the sensor that indicates the package is being detected by the sensor; and
  in response to receiving the position data:
   delete the tracking data from the loading registry; and
   store the tracking data in the zone registry; and
 redirection circuitry that is configured to:
  determine whether the package is to be redirected by parsing the tracking data; and
  in response to determining that the package is to be redirected, send a redirection command to a mechanical transducer.

25. The redirection apparatus of claim 24, wherein:
the decentralized tracking circuitry is further configured to cause the communications circuitry to send the tracking data to an external device in response to the package being redirected to the new zone.

* * * * *